US012134549B2

(12) United States Patent
Taylor et al.

(10) Patent No.: US 12,134,549 B2
(45) Date of Patent: Nov. 5, 2024

(54) RESTRAINT SPLINE FOR PIVOTING ARM OF VEHICLE LIFT

(71) Applicant: Vehicle Service Group, LLC, Madison, IN (US)

(72) Inventors: Steven Taylor, Hanover, IN (US); Robert Elliott, Madison, IN (US); Bryan Averill, Portland, OR (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 18/323,525

(22) Filed: May 25, 2023

(65) Prior Publication Data

US 2023/0382700 A1 Nov. 30, 2023

Related U.S. Application Data

(60) Provisional application No. 63/346,551, filed on May 27, 2022.

(51) Int. Cl.
*B66F 7/28* (2006.01)

(52) U.S. Cl.
CPC .................................... *B66F 7/28* (2013.01)

(58) Field of Classification Search
CPC .................................... B66F 7/16; B66F 7/28
See application file for complete search history.

(56) References Cited

U.S. PATENT DOCUMENTS

| | | | |
|---|---|---|---|
| 2,777,538 | A | 1/1957 | Cochin |
| 3,237,723 | A | 3/1966 | Halstead |
| 5,740,886 | A | 4/1998 | Fletcher |
| 6,279,685 | B1 | 8/2001 | Kogan et al. |
| 6,571,919 | B1 | 6/2003 | Stewart |
| 6,814,187 | B2 | 11/2004 | Brown et al. |

(Continued)

FOREIGN PATENT DOCUMENTS

| | | | |
|---|---|---|---|
| CN | 107215815 A | 9/2017 | |
| CN | 108190783 A * | 6/2018 | ................ B66F 7/00 |

(Continued)

OTHER PUBLICATIONS

Stertil-Koni Freedomlift, Heavy Duty 2-Post Lift. Retrieved from the internet <https://stertilkoni.com/en/vehicle-lifts/2-post-lifts>, accessed on May 16, 2023.

*Primary Examiner* — Diem M Tran
(74) *Attorney, Agent, or Firm* — Frost Brown Todd LLP

(57) ABSTRACT

A vehicle engagement assembly includes a base frame, a lift arm pivotally coupled to the base frame, and a pivot restraint mechanism that can inhibit rotation of the lift arm relative to the base frame about a pivot axis while the pivot restraint mechanism is in a restrained configuration. The base frame includes a first pair of flanges and a web connecting the first pair of flanges. The pivot restraint mechanism includes an arm restraint body and a base frame restraint body. The arm restraint body is associated with the lift arm such that the arm restraint body pivots with the lift arm relative to the base frame. The base frame restraint body is associated with the base frame and includes a rotational stopping surface that engages with the web to thereby transfer a rotational load from the lift arm onto the web in the restrained configuration.

20 Claims, 26 Drawing Sheets

(56) References Cited

U.S. PATENT DOCUMENTS

| | | | |
|---|---|---|---|
| 7,150,073 B2 | 12/2006 | Stewart | |
| 9,091,307 B2 | 7/2015 | Feusse et al. | |
| 9,205,738 B2 | 12/2015 | Clohessy et al. | |
| 9,382,951 B2 | 7/2016 | Reiner et al. | |
| 9,550,658 B2 | 1/2017 | Uhl et al. | |
| 10,844,913 B2 | 11/2020 | Boudreau et al. | |
| 11,401,143 B2 | 8/2022 | Benz | |
| 11,591,195 B2 | 2/2023 | Heath et al. | |
| 11,820,632 B2 * | 11/2023 | Kritzer | B66F 3/38 |
| 2004/0011594 A1 | 1/2004 | Stewart | |
| 2005/0235460 A1 | 10/2005 | Stewart | |
| 2012/0325587 A1 | 12/2012 | Matthews et al. | |
| 2013/0233651 A1 | 9/2013 | Kritzer | |
| 2016/0122168 A1 | 5/2016 | Benz | |
| 2020/0079627 A1 | 3/2020 | Perlstein | |
| 2020/0115206 A1 | 4/2020 | Benz | |
| 2021/0114852 A1 | 4/2021 | Heath et al. | |
| 2021/0331904 A1 | 10/2021 | Kritzer et al. | |
| 2022/0259020 A1 | 8/2022 | Stewart et al. | |
| 2023/0011902 A1 | 1/2023 | Denzik et al. | |
| 2023/0130107 A1 | 4/2023 | Murru et al. | |

FOREIGN PATENT DOCUMENTS

| | | | |
|---|---|---|---|
| CN | 116374879 | A | 7/2023 |
| DE | 1531325 | A1 | 7/1970 |
| EP | 0478035 | B1 | 2/1995 |
| EP | 1156009 | A1 | 11/2001 |
| JP | 2003-146594 | A | 5/2003 |
| KR | 100501430 | B1 | 7/2005 |
| KR | 101948553 | B1 | 2/2019 |
| KR | 102351333 | B1 | 1/2022 |
| WO | WO 2020/097605 | A2 | 5/2020 |

* cited by examiner

RESTRAINT SPLINE FOR PIVOTING ARM OF VEHICLE LIFT

This application claims priority to U.S. Provisional Application Ser. No. 63/346,551, entitled Restraint Spline for Pivoting Arm of Vehicle Lift, filed on May 27, 2022, the disclosure of which is incorporated by reference herein.

BACKGROUND

A vehicle lift is a device operable to lift a vehicle such as a car, truck, bus, etc. Vehicle lifts have varying designs and capabilities, including platform lifts that lift a parked vehicle via contact with tires in order to allow access to the underside of the vehicle; as well as frame-engaging lifts that raise a vehicle by contacting structural lifting points on the frame of the vehicle, allowing access to the underside of the vehicle and allowing wheels and tires to be removed or serviced.

Since vehicle service often includes removing or inspecting tires and wheels, frame-engaging lifts are a popular option. Vehicle lifts may include adjustable arms configured to adjust into various positions to suitably engage the frame of a vehicle. In some instances, an adjustable arm may be able to adjust its own length to suitably engage the frame of a vehicle. Additionally, or alternatively, an adjustable arm may be configured to pivot relative to other portions of the vehicle lift to suitably engage the frame of a vehicle.

While a variety of vehicle lifts have been made and used, it is believed that no one prior to the inventor(s) has made or used an invention as described herein.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

Figure 1A:
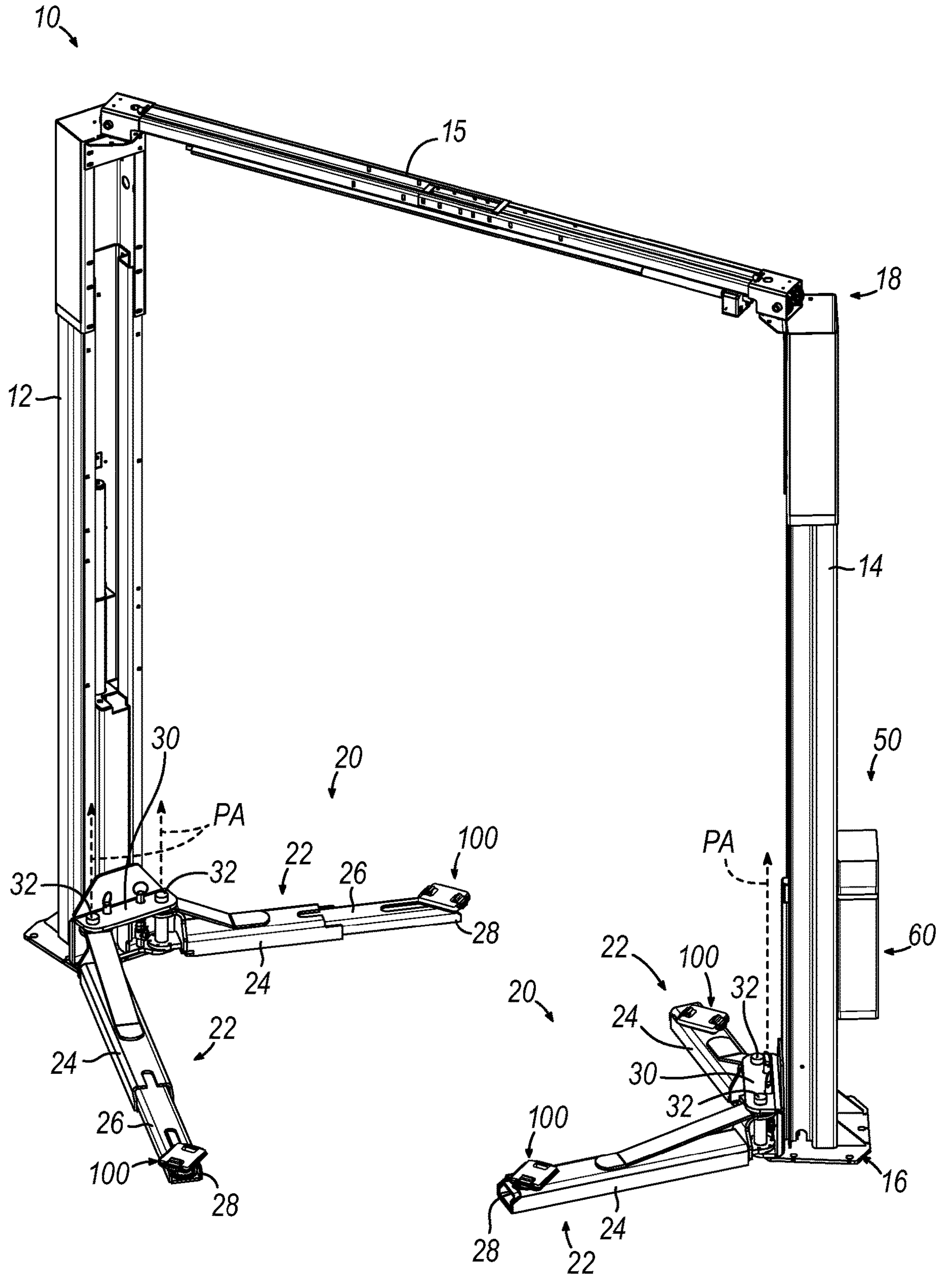
FIG. 1A is a perspective view of an illustrative two-post lift assembly in a lowered configuration.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Overview of Illustrative Frame-Engaging Lift

Figure 1B:
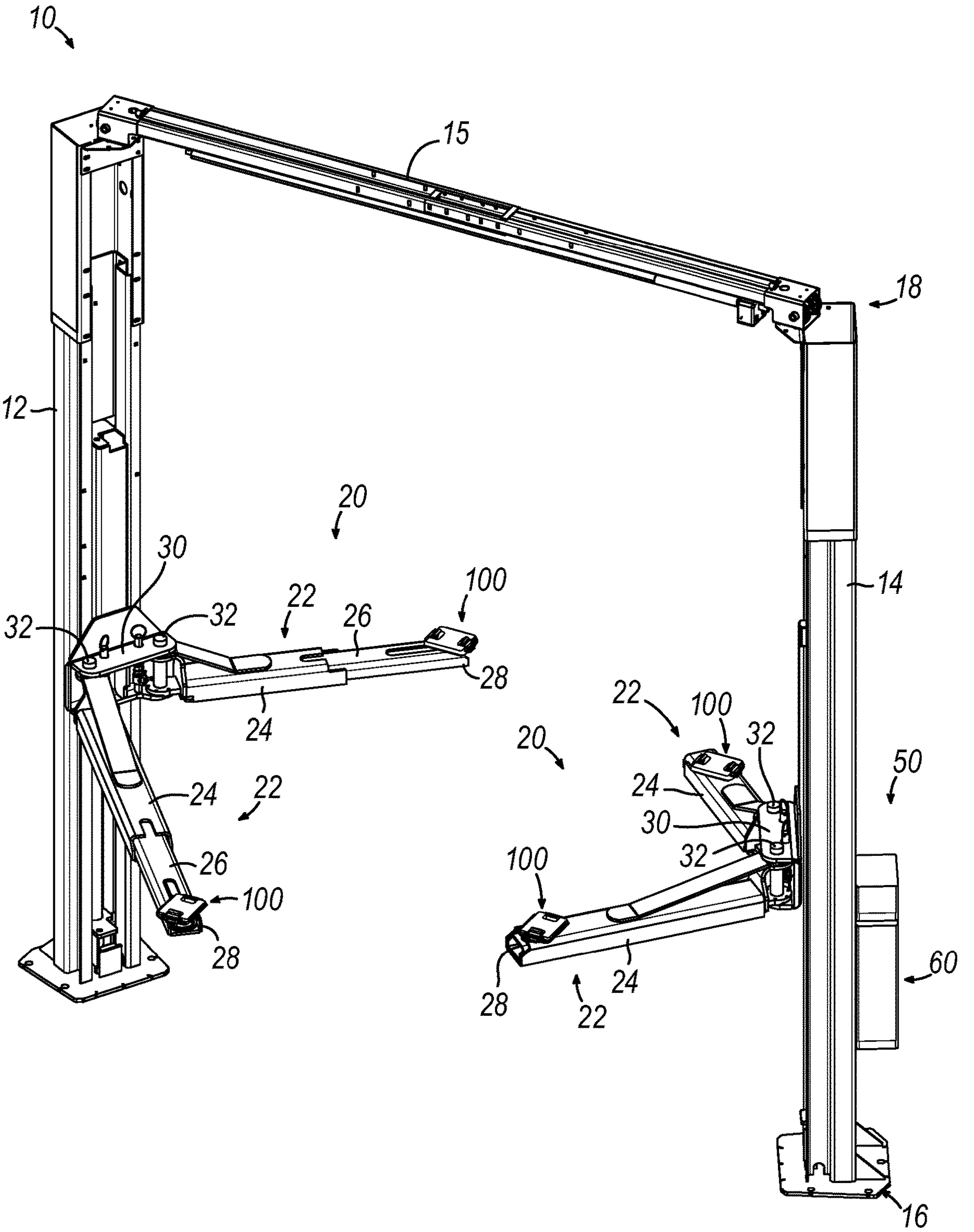
FIG. 1B is a perspective view of the two-post lift assembly of FIG. 1A in a raised configuration.

FIGS. 1A-1B show an illustrative frame-engaging vehicle lift, a two-post lift (10), that can be used to raise a vehicle, allow access to the underside of the vehicle, and allow wheels and tires of the vehicle to be removed or serviced. While the current frame-engaging vehicle lift is two-post lift (10), any other suitable frame-engaging vehicle lift may be used as would be apparent to one skilled in the art in view of the teachings herein. For example, the frame-engaging vehicle lift may be a scissor-lift assembly, a four-post lift, an in-ground lift, one or more portable lifts, etc.

Two-post lift (10) includes a pair of lift posts (12, 14), a crossbar (15) extending between lift posts (12, 14), a pair of lifting carriages (20) operatively coupled to a respective lift post (12, 14), a control assembly (50), and a drive assembly (60). Lift posts (12, 14) extend from a floor (16) to an elevated portion (18), while a crossbar (15) extends between lift posts (12, 14) around each at elevated portion (18). Crossbar (15), while entirely optional, may provide at least some degree of structural stability between lift posts (12, 14).

Lifting carriages (20) are configured to synchronously actuate along a path defined by respective lift posts (12, 14) between a lowered position (as shown in FIG. 1A) and a raised position (as shown in FIG. 1B). Lifting carriages (20) may also selectively lock into place relative to respective lift posts (12, 14) such that lifting carriages (20) may be prevented from inadvertently lowering once reaching a desired height. Therefore, lift posts (12, 14) may provide a mechanical path for respective lifting carriages (20) to actuate along. Any suitable components to promote synchronous actuation and locking of lifting carriages (20) relative to lift posts (12, 14) may be used as would be apparent to one skilled in the art in view of the teachings herein. As will be described in greater detail below, lifting carriages (20) are configured to engage the frame of a vehicle such that as lifting carriages (20) actuate between the lowered position (as shown in FIG. 1A) and the raised position (as shown in FIG. 1B), the vehicle will also be lifted and lowered between a corresponding lowered and raised positions.

Each lifting carriage (20) includes a base frame (30) and a pair of adjustable lifting arms (22) configured to be adjusted relative to their respective base frame (30) and relative to each other in order to suitably engage a vehicle frame. Base frames (30) suitably engage their respective lift post (12, 14) such that lifting carriages (20) may synchronously actuate along their path defined by lift posts (12, 14).

Each lifting arm (22) includes a collar (24) and an adjustable body (26) that terminates in an adapter coupling end (28). Each collar (24) is pivotally coupled to base frame (30) of the respective carriage (20) about a pivot axis (PA) via a pivot pin (32). Therefore, collar (24), adjustable body (26), and adapter coupling end (28) may be pivoted about pivot axis (PA) together into various rotational positions relative to base frame (30). In some instances, carriages (20) may have a pivot restraint mechanism to selectively fix each collar (24) into a desired rotational position relative to base frame (30) about pivot axis (PA). Therefore, lifting arms (22) may be pivoted and restrained into a desired rotational position relative to base frame (30) of carriage (20) in order to suitably align with a specific vehicle frame for lifting purposes.

Adjustable body (26) may actuate along a linear path defined by a respective collar (24) and into various longitudinal positions relative to collar (24). In some instances, carriages (20) may have a linear locking mechanism to selectively fix the longitudinal position of adjustable body (26) relative to the respective collar (24). Therefore, adjustable body (26) may be actuated and locked into a desired longitudinal position relative to the respective collar (24) in order to suitably align with a specific vehicle frame for lifting purposes.

Adjustable body (26) and adapter coupling end (28) may be fixed relative to each other, although this is merely optional. Adapter coupling end (28) is configured to selectively couple with various arm adapters, such as arm adapter (100). Arm adapters (100) may be configured to suitably engage vehicle frames such that lifting carriages (20) may lift vehicles in accordance with the description herein.

Two-post lift (10) may be connected to a power supply (not pictured) to provide power to various components of two-post lift (10), such as control assembly (50) and drive assembly (60). Control assembly (50) is operatively connected to drive assembly (60) such that an operator may utilize control assembly (50) to selectively activate drive assembly (60) in accordance with the teachings herein. Control assembly (50) may include any suitable components, such as a processor, logic control, etc., as would be apparent to one skilled in the art in view of the teachings herein. Additionally, control assembly (50) may include any suitable number of user input features in order to utilize two-post lift (10) in accordance with the description herein. In the current example, control assembly (50) is physically attached to the rest of two-post lift (10), but this is merely optional. In some embodiments, control assembly (50) may be detached from the rest of two-post lift (10) such that control assembly (50) is in wired/wireless communication with other suitable components of two-post lift (10). In some embodiments, control assembly (50) is incorporated into a wireless pendant, a smart phone, a tablet, or a control station such as a desktop or laptop.

Drive assembly (60) is configured to raise and lower carriages (20) in accordance with the description herein by producing mechanical energy that is translated to a lifting motion of the carriages (20) through a mechanical linkage, hydraulic system, other systems, or any combination thereof as will be apparent to one skilled in the art in view of the teachings herein. Therefore, drive assembly (60) may include any number of suitable components to raise and lower carriages (20) in accordance with the description herein.

During illustrative use, the operator may place a vehicle between lift posts (12, 14) with carriages (20) at or near the lowered position. Next, the operator may suitably align carriages (20) with a frame of the vehicle by rotating and extending/retracting adjustable lift arms (22). When carriages (20) have been suitably positioned such that arm adapters (100) are aligned with the frame of the vehicle, the operator may utilize control assembly (50) in order to active drive assembly (60) to synchronously raise carriages (20) such that arm adapters (100) engage the frame and thereby lift the vehicle. Once carriages (20) lift the vehicle to a desired height, the operator may utilize control assembly (50) to instruct drive assembly (60) to stop raising carriages (20). In some instances, a vertical lockout assembly may be used to ensure carriages (20) remain locked at the desired height along lift posts (12, 14).

When the operator desires to lower the vehicle, the operator may use control assembly (50) to activate drive assembly (60) to synchronously lower carriages (20) such the vehicle is lowered to the ground and arm adapters (100) disengage the frame of the vehicle. With arm adapters (100) disengaged from the frame of the vehicle, the vehicle may be removed from the lifting area, and another vehicle may be subsequently moved into the lifting area for service.

II. Illustrative Pivot Restraint Assemblies for Adjustable Lift Arms

As mentioned above, adjustable lift arms (22) may pivot relative to their base frame (30) about their pivot axis (PA) via a respective pivot pin (32). Such pivoting of lift arms (22) may be needed to suitably align an arm adapter (100) with a lift point on a vehicle frame. As also mentioned above, carriages (20) may have a pivot restraint mechanism to selectively fix the rotational position of lift arms (22) in the desired rotational position about their pivot axis (PA).

The pivot restraint mechanism may include a first restraint feature and a second, complementary restraint feature configured to selectively engage each other to rotationally lock lift arm (22) relative to base frame (30). Therefore, a first restraint feature may be associated with lift arm (22), while a second restraint feature may be associated with base frame (30) such that, if a rotational load were imparted on lift arm (22) while the pivot restraint mechanism was in the restrained configuration, lift arm (22) would be inhibited from rotating relative to base frame (30) via engagement between the first and second restraint features. In other words, such a rotational load would be transmitted from lift arm (22) onto base frame (30) via the pivot restraint mechanism.

A. First Illustrative Rotational Restraint Assembly

In some instances, it may be desirable to significantly improve the strength of first and second restraint features such that the restraint features can transmit large rotational loads from lift arm (22) onto base frame (30) without (A) causing the pivot restraint mechanism to fail, and/or (B) damaging components of the pivot restraint mechanism. However, improving the robustness of the pivot-restraint mechanism may lead to taking up an undesirable amount of space, thereby creating undesirable obstacles on the shop floor. Therefore, it may be desirable to accomplish such improvements while keeping the pivot restraint mechanism compact.

FIGS. 2-4D show pivot restraint mechanism (70), which includes an arm restraint body (72) and a base frame restraint body (80), which are associated with a respective lift arm (22) and base frame (30), respectively. As will be described in greater detail below, pivot restraint mechanism (70) is capable of selectively restraint the rotational position of lift arm (22) relative to base frame (30) about pivot axis (PA) such that lift arm (22) may be pivoted to a suitable position for engaging a structural lifting point of a vehicle's frame. As will also be described in greater detail below, bodies (72, 80) of pivot restraint mechanism (70) (A) are completely housed between respective flanges (23, 34) defining pin holes (25, 36), and (B) substantially maintain their rotational position relative to their respective components via engagement with surfaces (21, 38) located between respective flanges (23, 34) defining pin holes (25, 36); either of which may result in a compact pivot restraint mechanism (70).

Figure 2:
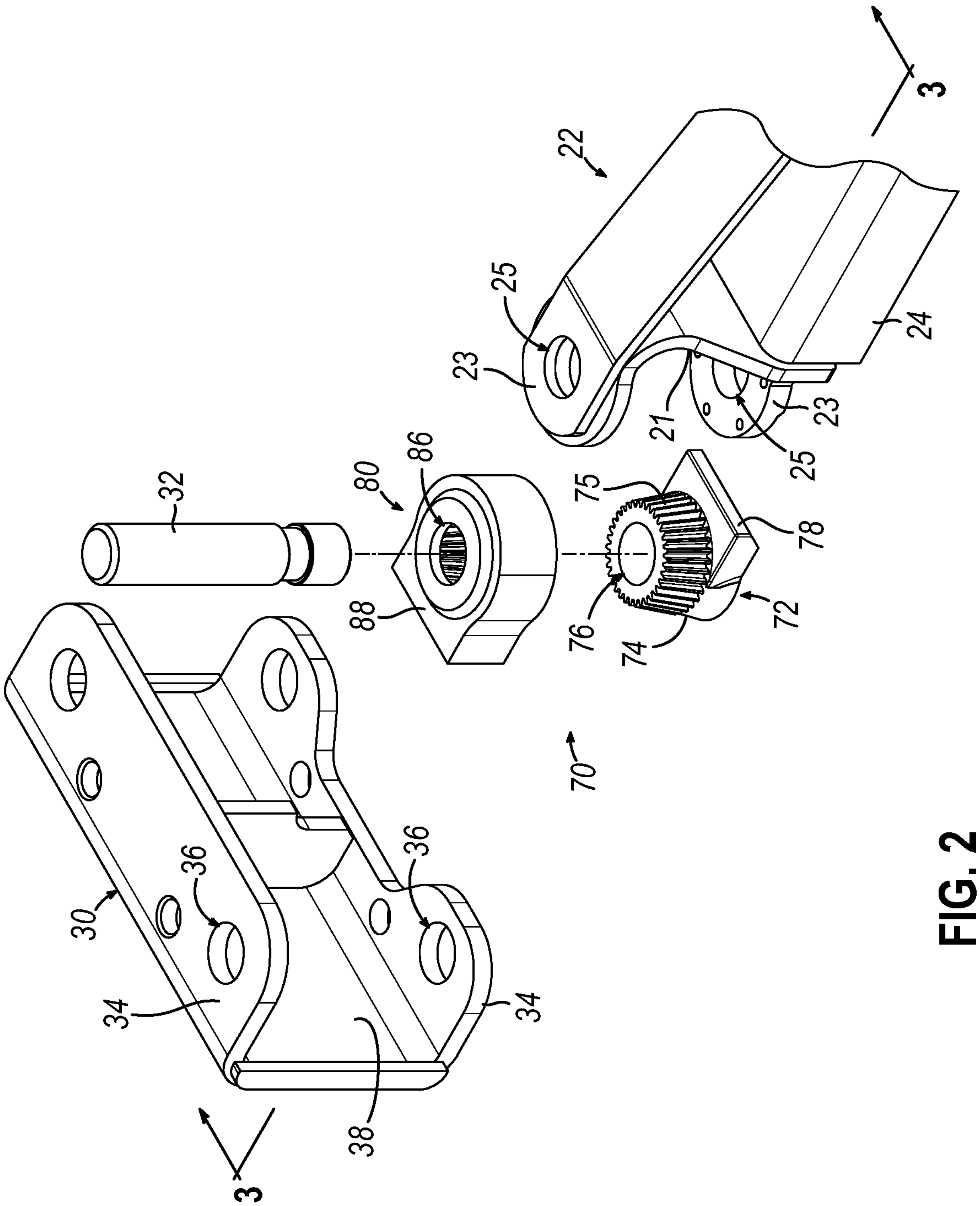
FIG. 2 is an exploded perspective view of a base frame, an adjustable lift arm, and a pivot restraint mechanism of the two-post lift assembly of FIG. 1A.
Figure 3:
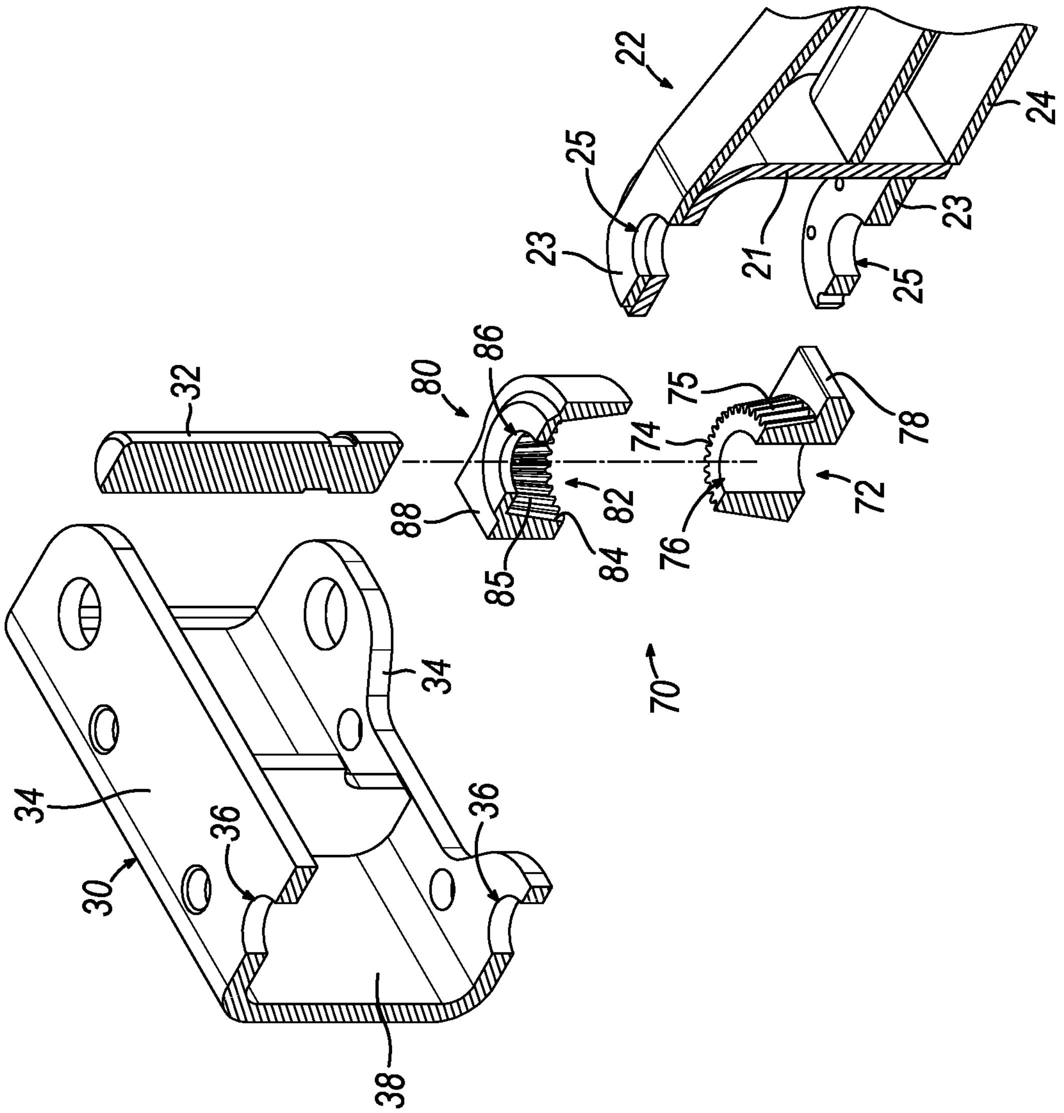
FIG. 3 is a sectional view of the base frame, adjustable lift arm, and pivot restraint mechanism of FIG. 2, taken along line 3-3 of FIG. 2.

As best shown in FIGS. 2-3, arm restraint body (72) includes a tapered external surface (74), a circumferential array of splines (75) extending along tapered external surface (74), and a rotation stopping surface (78) extending away from tapered external surface (74). Arm restraint body (72) defines a through hole (76) dimensioned to receive pin (32). Therefore, as shown in FIGS. 4A-4D, once assembled, arm restraint body (72) is pivotally associated with pin (32) such that arm restraint body (72) may rotate about pivot axis (PA) defined by pin (32). Additionally, restraint body (72) is coupled with pin (32) such that restraint body (72) is housed between flange (23) defining pin holes (25); which may contribute to the compact nature of pivot restraint mechanism (70). While in the current example through hole (76) is defined by a portion of arm restraint body (72) extending to form a continuous annular surface, this is merely optional. In some instances, the portion of arm restraint body (72) defining through hole (76) is not continuous, but merely sufficient to rotationally couple arm restraint body (72) with pin (32) such that arm restraint body (72) does not disassociate from pin (32) after assembly.

Tapered external surface (74) is dimensioned to be received within a cavity (82) defined by base frame restraint body (80) such that external surface (74) may be directly adjacent to at least a portion of an internal surface (84) of base frame restraint body (80). As will be described in greater detail below, tapered external surface (74) and/or splines (75) extending along surface (74) may be configured to suitably engage a portion of base frame restraint body (80) in order to rotationally restrain bodies (72, 80) when bodies (72, 80) are in the restrained configuration.

Rotational stopping surface (78) is dimensioned to abut against a corresponding rotational stopping surface (21) of lift arm (22) once assembled. Interaction between rotational stopping surfaces (78, 21) prevents arm restraint body (72) from rotating about pin (32) relative to lift arm (22). If lift arm (22) rotates relative to base frame (30) in accordance with the description herein, arm restraint body (72) will also rotate with lift arm (22) relative to base frame (30) due to the interaction between rotational stopping surfaces (78, 21).

Rotational stopping surface (21) of lift arm (22) acts as a connecting bracket between flanges (23) defining pin holes (25) such that rotational stopping surface (21) and flanges (23) form a U-shaped yoke end that may assist in rotationally coupling lift arm (22) with base frame (30) via pin (32).

Therefore, rotational stopping surface (78) of arm restraint body (72) engages a surface (21) of lift arm (22) that is located between flanges (23) in order to rotationally fix arm restraint body (72) with lift arm (22).

In the current example, rotational stopping surfaces (78, 21) are substantially flat and planar. However, this is merely optional, as stopping surfaces (78, 21) may have any suitable geometry as would be apparent to one skilled in the art in view of the teachings herein. In some instances, there may be more than one pair of stopping surfaces (78, 21) configured to rotationally fix lift arm (22) with arm restraint body (72). In the current example, rotational stopping surface (21), located between flanges (23), acts as a connecting bracket to form a yoke with flanges (23) defining pin holes (25). However, this is merely optional, as rotational stopping surface (21) could be located at any suitable location between flanges (23) as would be apparent to one skilled in the art in view of the teachings herein.

Base frame restraint body (80) includes tapered internal surface (84) and a circumferential array of splines (85) extending along a length of internal surface (84). Base frame restraint body (80) defines a through hole (86) dimensioned to receive pin (32). Therefore, as shown in FIGS. 4A-4D, once assembled, base frame restraint body (80) is associated with pin (32). Additionally, base frame restraint body (80) is coupled with pin (32) such that restraint body (80) is housed between flanges (34) defining pin holes (36); which may contribute to the compact nature of pivot restraint mechanism (70). While in the current example, through hole (86) is defined by a portion of base frame restraint body (80) extending to form a continuous annular surface, this is merely optional. In some instances, the portion of base frame restraint body (80) defining through hole (86) is not continuous, but merely sufficient to rotationally couple base frame restraint body (80) with pin (32) such that base frame restraint body (80) does not disassociate from pin (32) after assembly.

Internal surface (84) defines a cavity (82) dimensioned to house a portion of external surface (74) of arm restraint body (72) such that surface (74) may be directly adjacent to at least a portion of an internal surface (84) of base frame restraint body (80). Base frame restraint body (80) may be configured to vertically actuate along pin (32) about pivot axis (PA) in order to selectively disengage and engage arm restraint body (72).

Splines (75, 85) complement each other such that when external surface (74) and internal surface (84) are directly adjacent to each other, splines (75, 85) engage to rotationally restrain bodies (72, 80) relative to each other about pivot axis (PA). While splines (75, 85) are used in the current example, any other suitable structure may be used in order to inhibit rotation of bodies (72, 80) relative to each other about pivot axis (PA) of pin (32). For instance, in some examples, splines (75, 85) may be completely omitted such that the frictional braking force provided by contact between smooth surfaces (74, 84) is sufficient to suitably inhibit rotation of bodies (72, 80) relative to each other such that lift arm (22) remains in a suitable rotational position relative to base frame (30) during illustrative use.

Rotational stopping surface (88) is dimensioned to abut against a corresponding rotational stopping surface (38) of base frame (30) once assembled. Interaction between rotational stopping surfaces (88, 38) prevents base frame restraint body (88) from rotating about pin (32) relative to base frame (30). While stopping surfaces (88, 38) suitably engage each other to inhibit rotation of restraint body (80) with base frame (30), restraint body (80) may suitably actuate along a length of pin (32) relative to base frame (30) in order to transition between engagement and disengagement with arm restraint body (72) in accordance with the description herein.

Rotational stopping surface (38) of base frame (30) acts as a connecting bracket between flanges (34) defining pin holes (36) such that rotational stopping surface (38) and flanges (34) form a U-shaped yoke end that may assist in rotationally coupling lift arm (22) with base frame (30) via pin (32). Therefore, rotational stopping surface (88) of base frame restraint body (80) engages surface (38) of base frame (30) that is located between flanges (34) in order to rotationally fix arm restraint body (80) with base frame (30). Rotational stopping surface (38) acts as a web between flanges (34) such that rotational stopping surface (38) extends laterally between flanges (34) and defines a first pair of pin holes (36) and a second set of pin holes (36), each set configured to rotationally couple to a respective lift arm (22). In other words, rotational stopping surface (38) extends laterally to associate with two lift arms (22). The same stopping surface (38) engages a first base frame restraint body (80) of a first lift arm (22) and a second base frame restraint body (80) of a second lift arm (22). Additionally, since rotational stopping surface (38) acts as the connecting web between upper and lower flanges (34) to form a yoke, rotational stopping surface (38) faces inwards toward the area of lift (10) configured to receive a vehicle to be lifted. Having rotational stopping surface (38) act as the laterally connecting web that forms a yoke structure configured to rotationally support two lift arms (22) may allow for a simpler design of base frame (30), as compared to adding support gussets to base frame (30) to act as rotational stopping surfaces.

If lift arm (22) rotates relative to base frame (30) in accordance with the description herein, base frame restraint body (80) will remain rotationally fixed about pivot axis (PA) relative to base frame (30) due to the interaction between rotational stopping surfaces (88, 38).

Therefore, restraint body (80) may be rotationally fixed relative to base frame (30) about the pivot axis (PA) of pin (32) during assembly so long as rotational stopping surfaces (88, 38) are suitably aligned when pin (32) is inserted through pin holes (25, 36) and through hole (86) during assembly. In the current example, rotational stopping surfaces (38, 88) are substantially flat and planar. However, this is merely optional, as stopping surfaces (38, 88) may have any suitable geometry as would be apparent to one skilled in the art in view of the teachings herein. In some instances, there may be more than one pair of stopping surfaces (38, 88) configured to rotationally fix base frame (30) with restraint body (80).

Figure 4A:
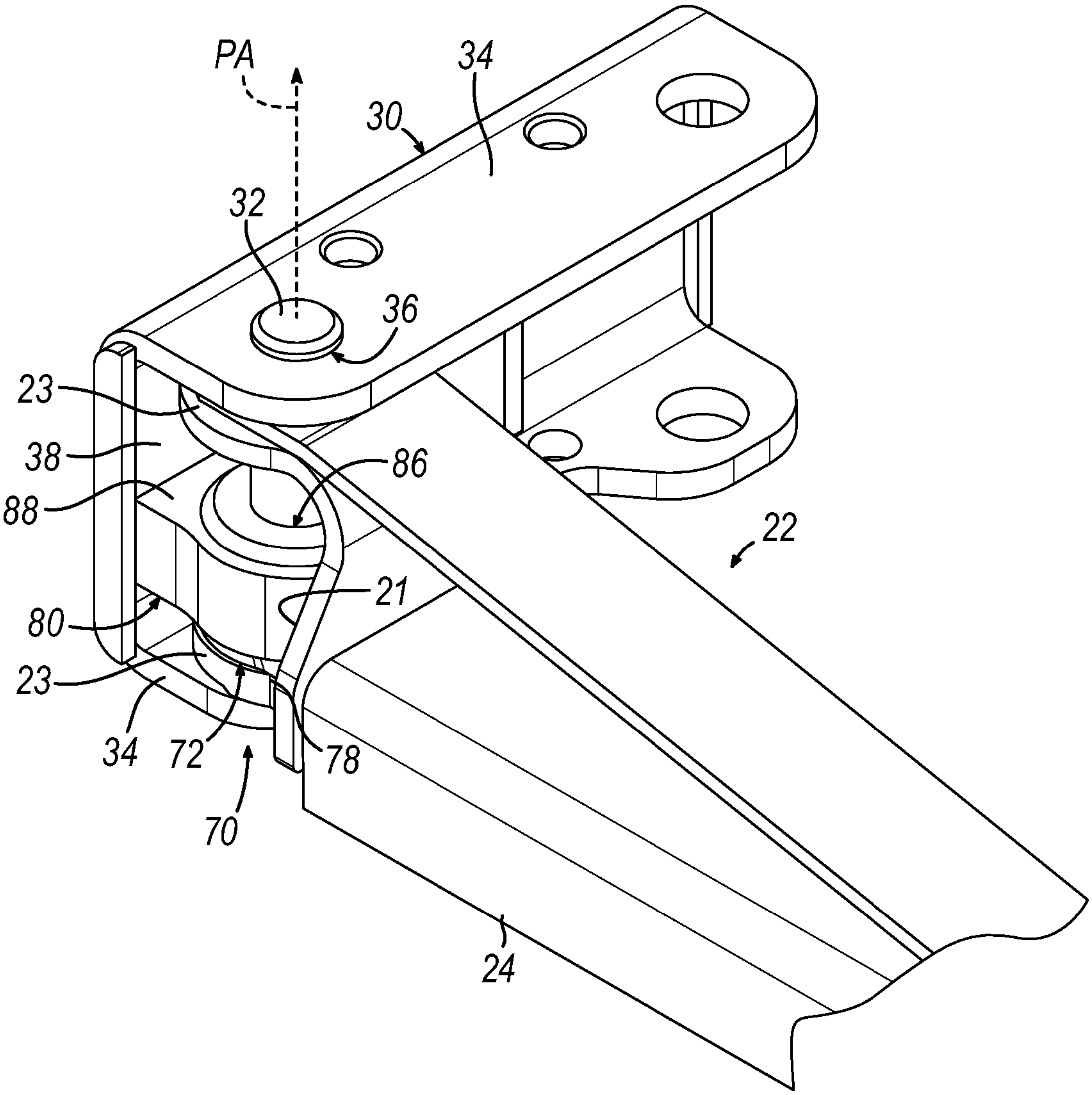
FIG. 4A is a perspective view of the adjustable lift arm of FIG. 2 in a first rotational position relative to the base frame of FIG. 2, with the pivot restraint mechanism of FIG. 2 in a restrained configuration.

FIGS. 4A-4D show an illustrative use of restraint mechanism (70) to pivot lift arm (22) relative to base frame (30) between two rotational positions. First, as shown in FIG. 4A, restraint mechanism (70) may be in the restrained configuration such that base frame restraint body (80) rests on top of arm restraint body (72). In the position shown in FIG. 4A, tapered internal surface (84) and tapered external surface (74) are directly adjacent to each other to thereby inhibit rotation of bodies (72, 80) relative to each other in accordance with the description herein. It should be understood that in examples where splines (75, 85) are incorporated, splines (75, 85) may be in suitable engagement to rotationally restrain bodies (72, 80) relative to each other.

Since restraint surfaces (78, 21) are abutting against each other, and since restraint surfaces (88, 38) are abutting against each other, arm restraint body (72) is rotationally fixed to lift arm (22) while frame restraint body (80) is rotationally fixed relative to base frame (30). Therefore, when restraint bodies (72, 80) are in the restrained position shown in FIG. 4A, lift arm (22) may be inhibited from rotating about pivot axis (PA) relative to base frame (30). The engagement between (A) restraint surfaces (78, 21), (B) restraint surfaces (88, 38), and (C) splines (75, 85) may further improve the strength of pivot restraint mechanism (70), enabling it to withstand large rotational loads acting on lift arms (22) while still inhibiting rotation of lift arm (22) about pivot axis (PA).

Figure 4B:
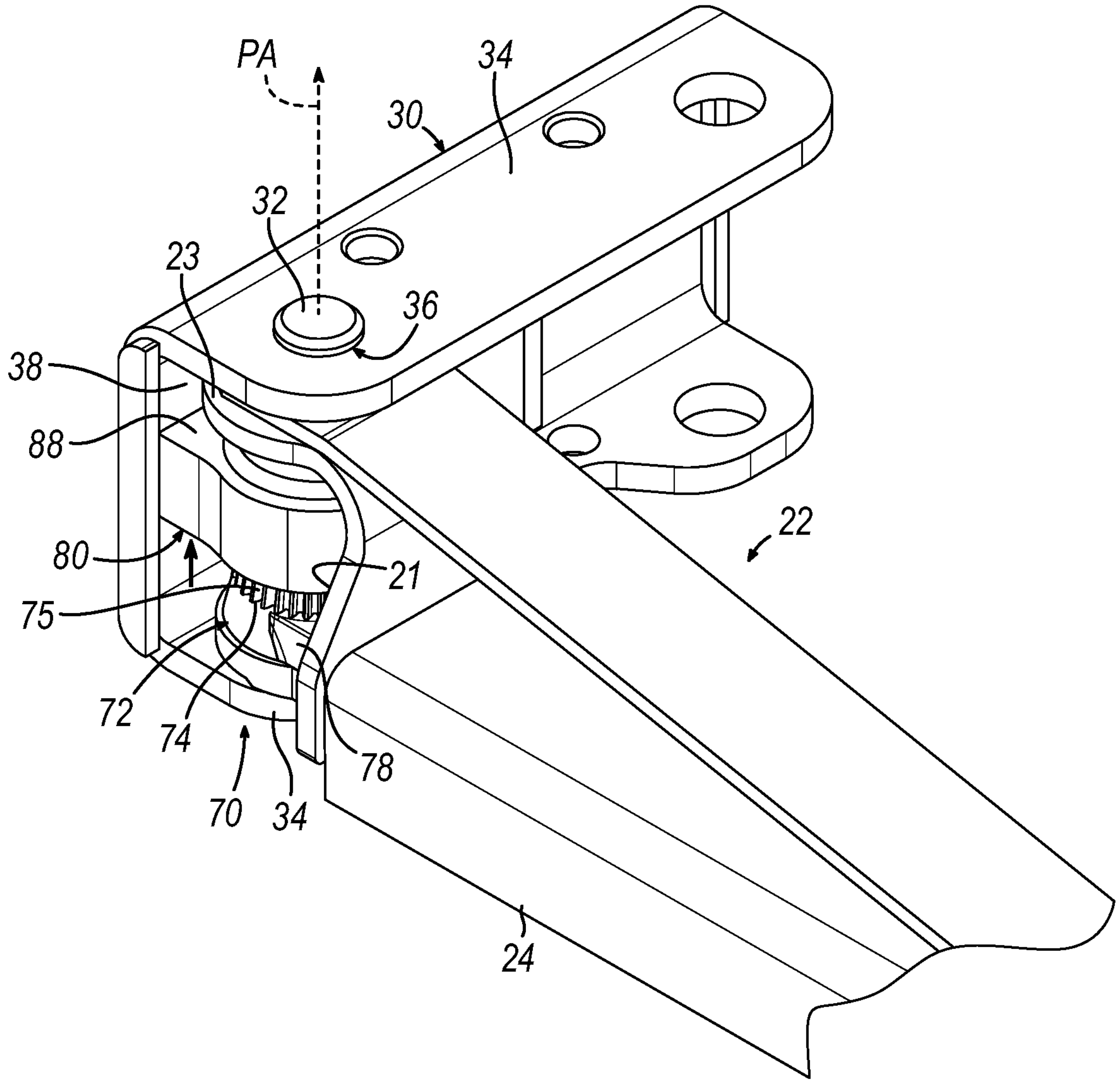
FIG. 4B is a perspective view of the adjustable lift arm of FIG. 2 in the first rotational position relative to the base frame of FIG. 2, with the pivot restraint mechanism of FIG. 2 in an unrestrained configuration.

If an operator desires to rotate lift arm (22), the operator may vertically actuate base frame restraint body (80) upward such that tapered surfaces (74, 84) are no longer directly adjacent to each other, thereby actuating restraint mechanism (70) into the unrestrained configuration, as shown between FIGS. 4A-4B. Therefore, in instances where splines (75, 85) are incorporated, splines (75, 85) may not be engaged with each other. In instances, where the frictional braking force between tapered surfaces (74, 84) inhibits rotation of arm (22) relative to base (30), tapered surfaces (74, 84) may no longer be engaged with each other.

Figure 4C:
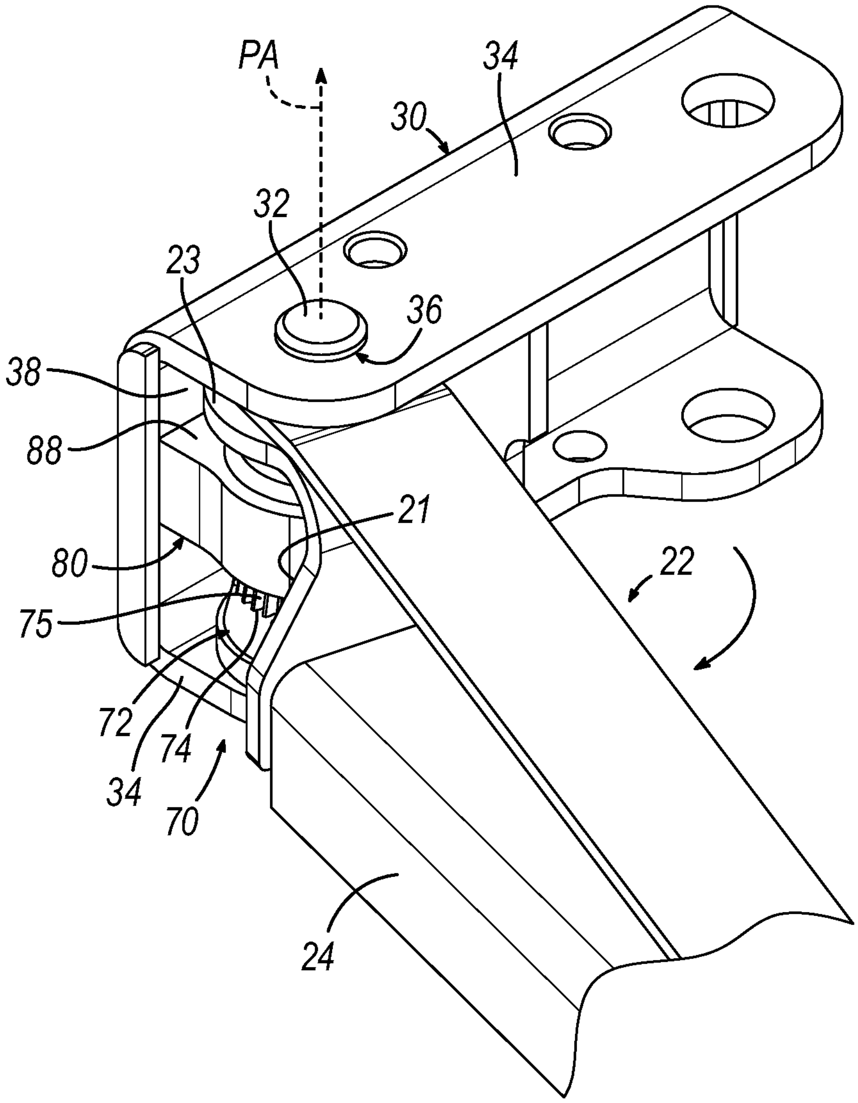
FIG. 4C is a perspective view of the adjustable lift arm of FIG. 2 in a second rotational position relative to the base frame of FIG. 2, with the pivot restraint mechanism of FIG. 2 in the unrestrained configuration.
Figure 4D:
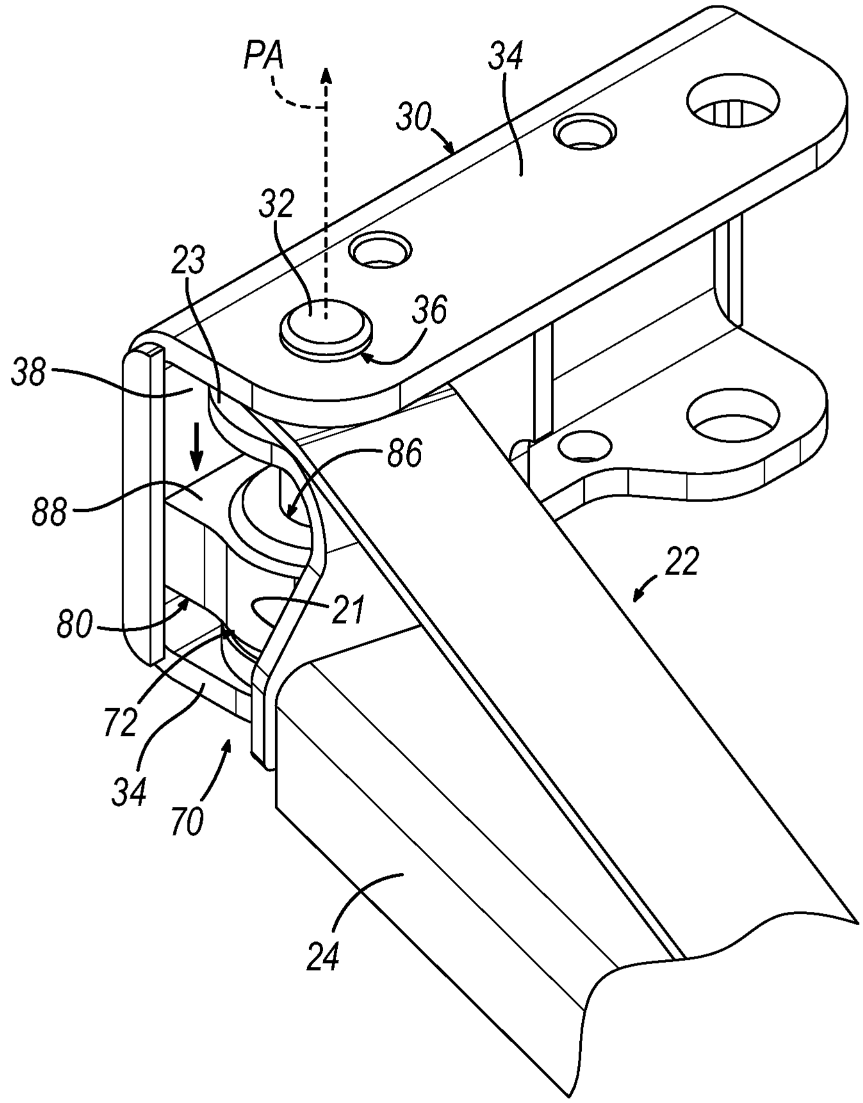
FIG. 4D is a perspective view of the adjustable lift arm of FIG. 2 in the second rotational position relative to the base frame of FIG. 2, with the pivot restraint mechanism of FIG. 2 in the restrained configuration.

As shown between FIGS. 4B-4C, with restraint mechanism in the unrestrained configuration, the operator may rotate arm (22) relative to base frame (30) about pivot axis (PA) in order to position arm (22) into a suitable rotational position to engage vehicle in accordance with the description herein. Next, as shown in FIG. 4D, the operator may actuate restraint body (80), or allow restraint body (80) to actuate, back into the restrained configuration such that further rotation of lift arm (22) relative to base frame (30) is inhibited. Since pivot restraint mechanism (70) is housed between flanges (23, 34) defining pin holes (25, 36), pivot restraint mechanism (70) may be compactly stored, thereby reducing the chances of acting as an obstruction on the shop floor.

Figure 5:
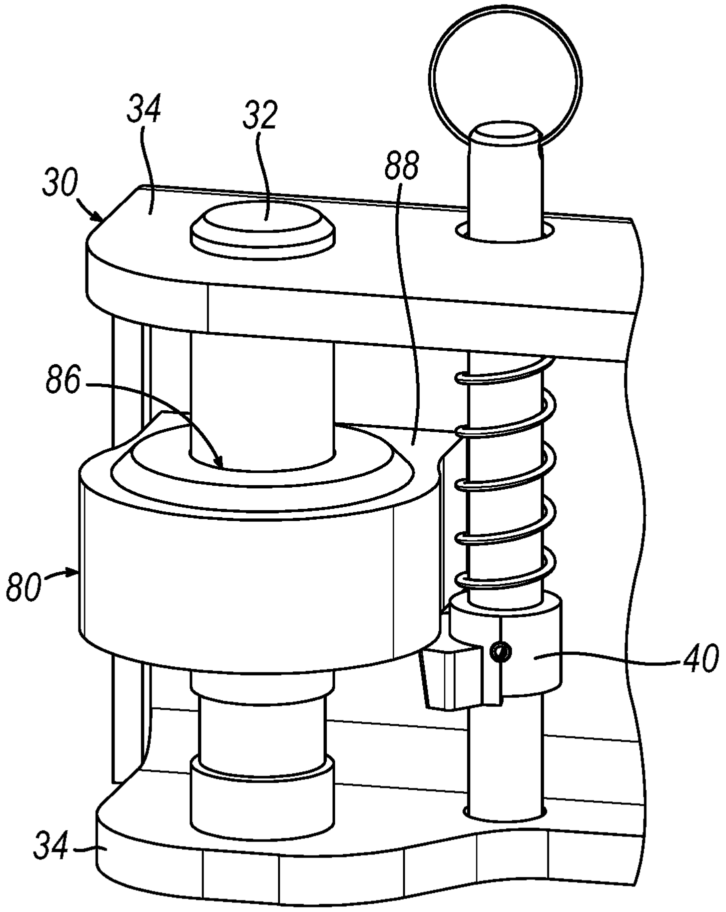
FIG. 5 is a perspective view of the base frame of FIG. 2 coupled with a base frame restraint member of the pivot restraint mechanism of FIG. 2, with a pin assembly that may be used to actuate the pivot restraint mechanism between the restrained configuration and the unrestrained configuration.

FIG. 5 shows an illustrative pin assembly (40) that may be utilized by an operator in order to actuate base frame restraint body (80) between the restrained configuration and the unrestrained configuration. Pin assembly (40) may be pulled upward to drive base frame restraint body (80) upward, thereby transitioning restraint mechanism (70) into the unrestrained configuration. Pin assembly (40) may be biased by a spring such that restraint body (80) is biased toward the restrained configuration.

B. Second Illustrative Rotational Restraint Assembly

Figure 6:
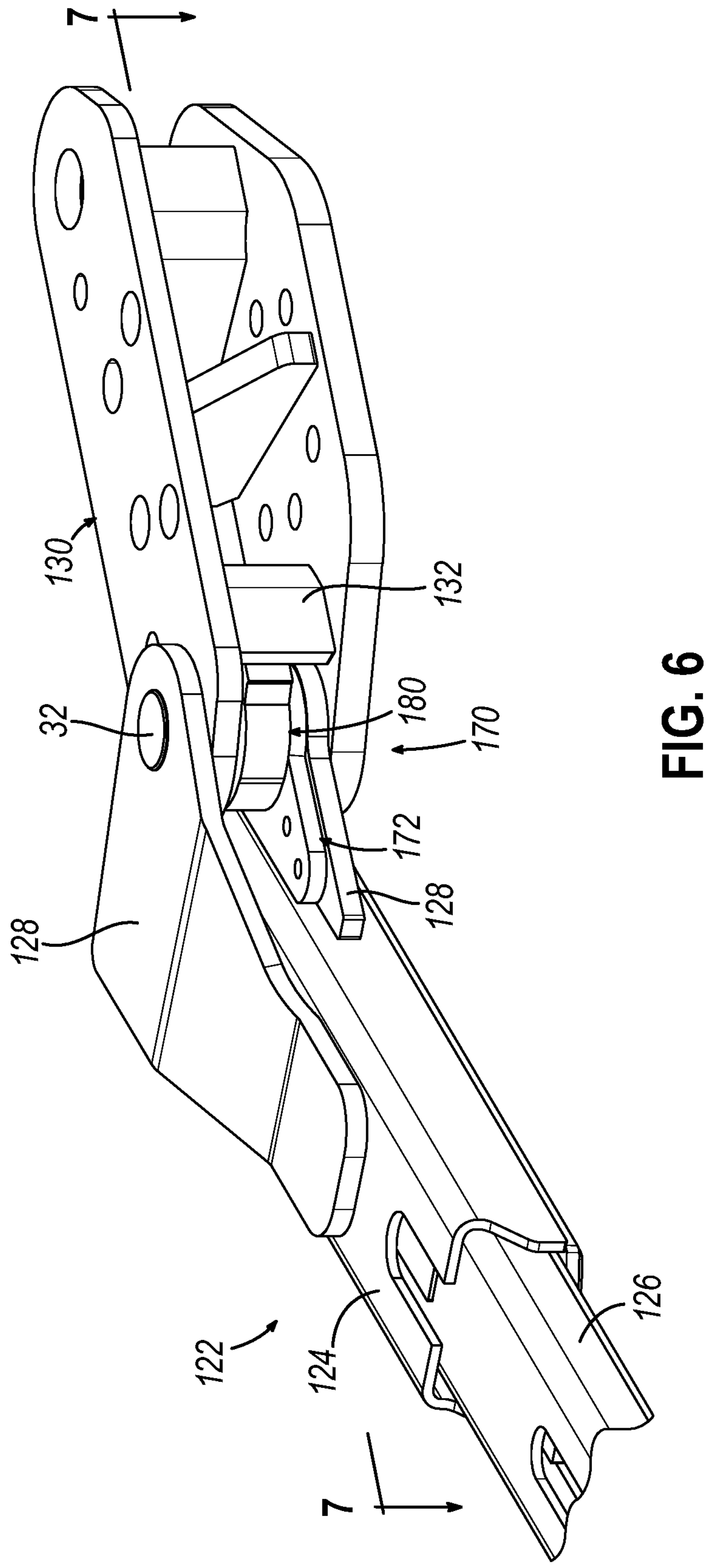
FIG. 6 is a perspective view of an alternative adjustable arm, and alternative base frame, and an alternative pivot restraint mechanism.
Figure 7:
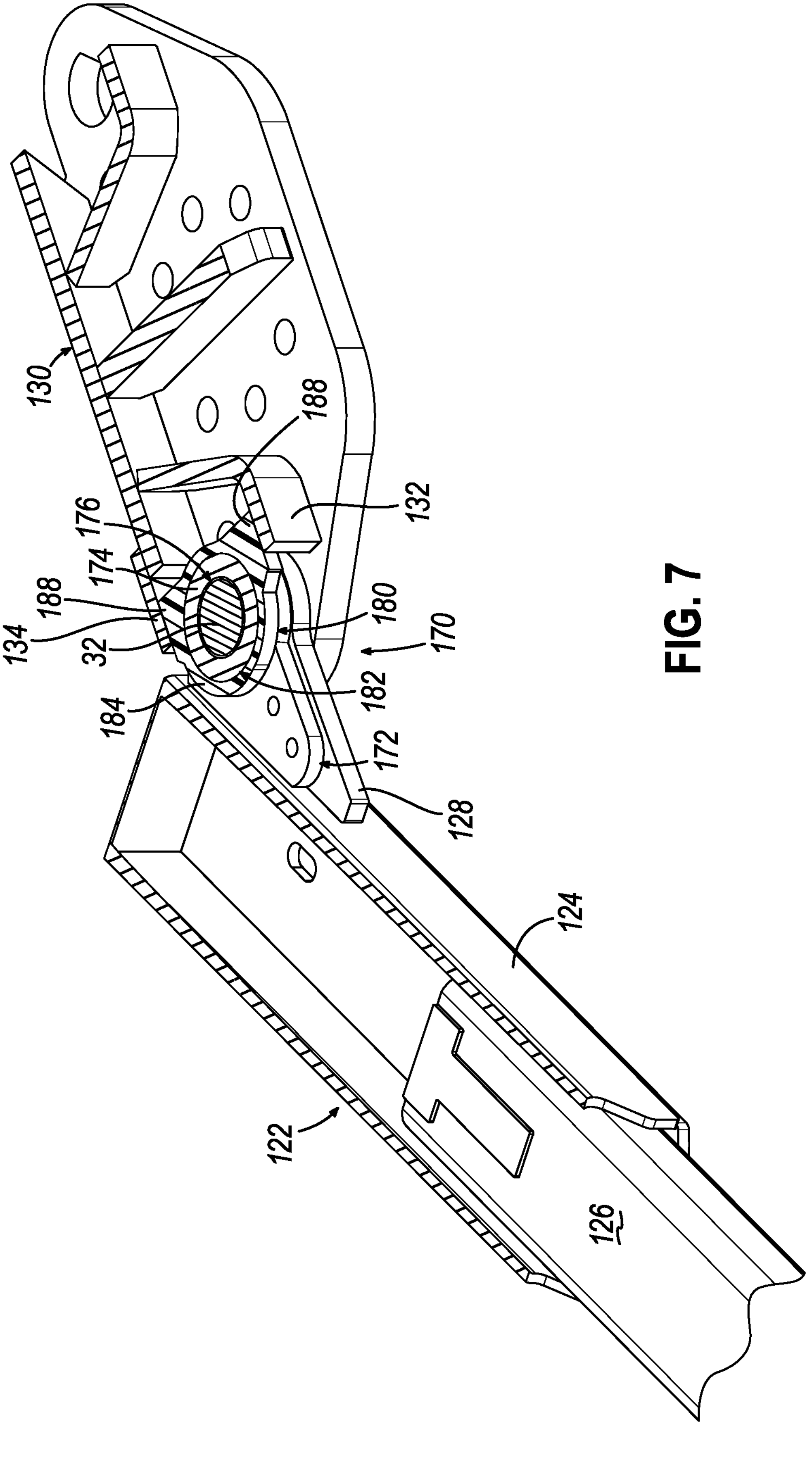
FIG. 7 is a sectional view of the adjustable arm, base frame, and pivot restraint mechanism of FIG. 6, taken along line 7-7 of FIG. 6.
Figure 8:
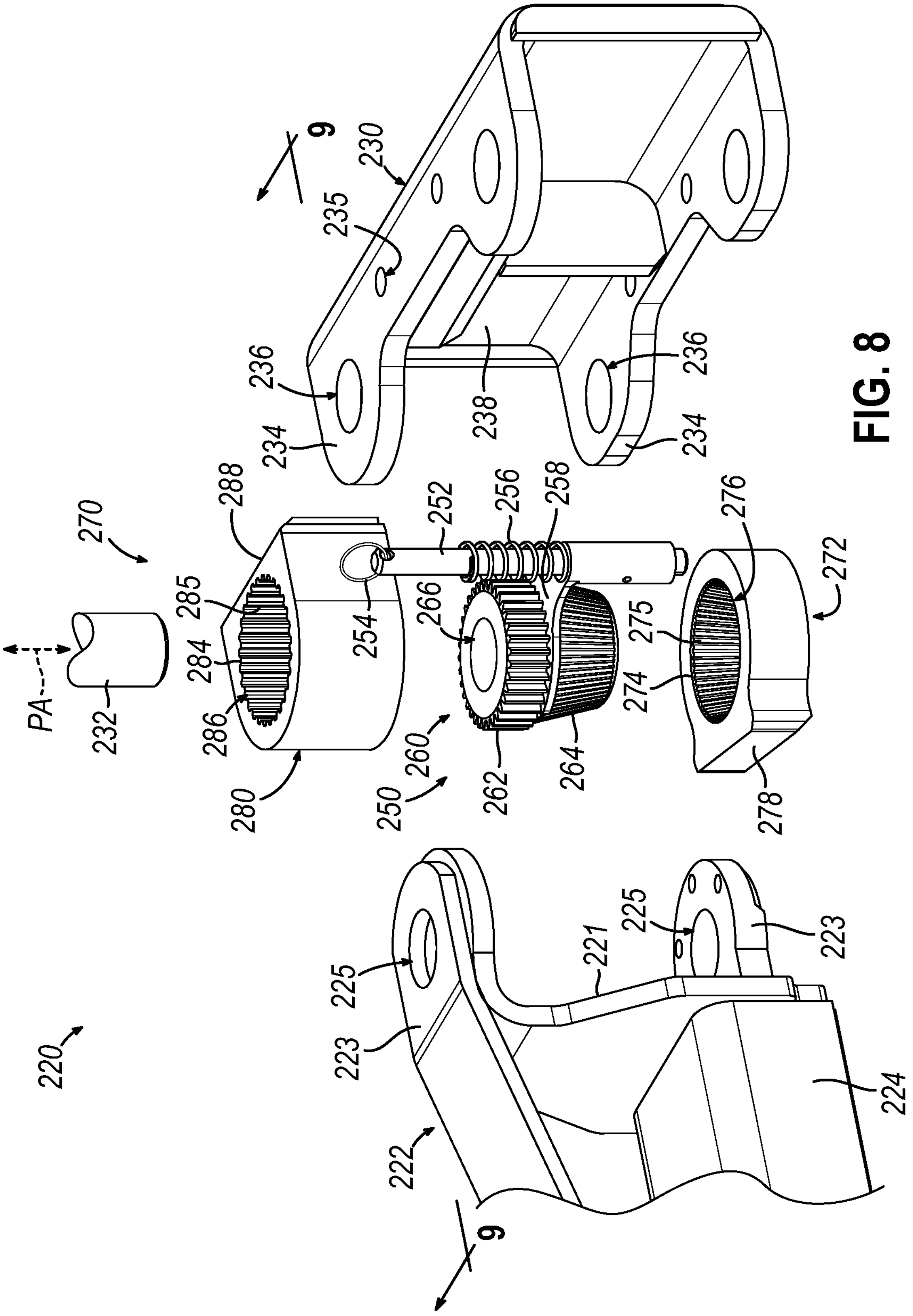
FIG. 8 is an exploded perspective view of another alternative base frame, another alternative adjustable lift arm, and another alternative pivot restraint mechanism.
Figure 9:
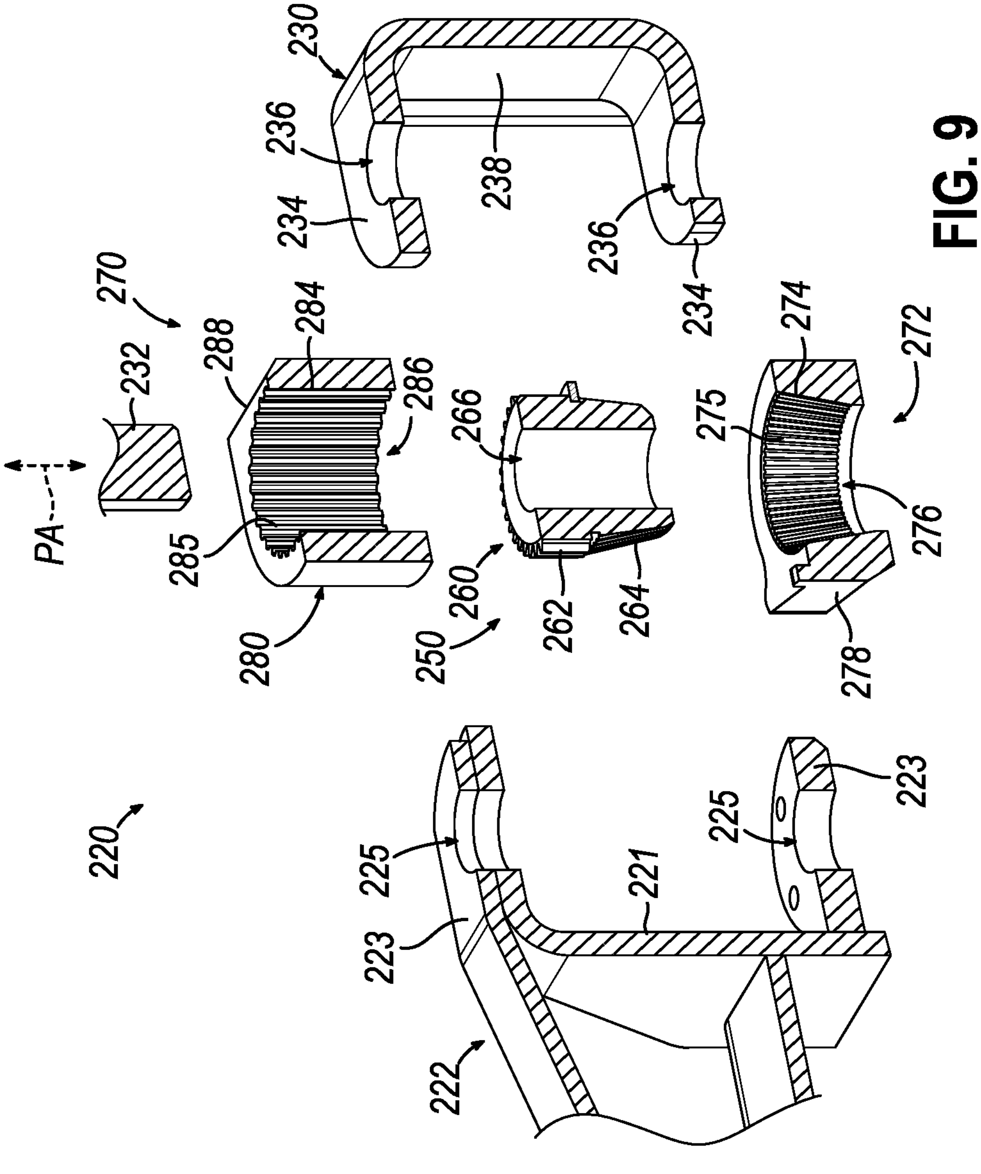
FIG. 9 is a sectional view of the base frame, adjustable lift arm, and pivot restraint mechanism of FIG. 8, taken along line 9-9 of FIG. 8.

In some instances, one restraint body may be fixed to its respective component, while the other restraint body may be fixed to its respective component. Also, in some instances more than one pair of rotations restraint surfaces may be used to rotationally fix a restraint body relative to its respective component. FIGS. 6 and 7 show an alternative restraint mechanism (170) incorporating such features. Therefore, restraint mechanism (170) may be substantially similar to restraint mechanism (70) described above, with differences elaborated below.

Restraint mechanism (170) is configured to selectively rotationally restrain a lift arm (122) and a base frame (130), which may be substantially similar to lift arm (22) and base frame (30) described above, with differences elaborated below. Base frame (130) may be configured to couple with an inground lift-post, rather than lift two-post, above ground, lift system (10) described above. Base frame (130) includes a pair of rotational stopping surfaces (132).

Lift arm (122) includes a collar (124) and an adjustable body (126), which are substantially similar to collar (24) and adjustable body (26) described above. Additionally, lift arm (122) includes a pair of laterally extending flanges (128) configured to receive pin (32).

Pivot restraint mechanism (170) includes an arm restraint body (172) and a base frame restraint body (180), which are substantially similar to restraint bodies (72, 80), described above, respectively, with differences elaborated below.

In particular restraint body (172) is fixed to a bottom flange (128) of lift arm (22) such that tapered external surface (174) and splines (176) is fixed to flange (128). Additionally, base frame restraint body (180) includes two rotational stopping surfaces (188) configured to abut against a corresponding stopping surface (134) of base frame (130) thereby to rotationally fix splines (182) and internal surface (184) to base frame (30).

C. Third Illustrative Rotational Restraint Assembly

In some instances, rather than having arm restraint body (72) and base frame restraint body (80) directly engage each other in order to rotationally restrain lift arms (22) relative to base frame (30), such as through contact between surfaces (74, 84) and/or splines (75, 85), it may be desirable to have an intermediary component that moves relative to restraint bodies (72, 80) in order to selectively restrain rotation of lift arm (220) relative to base frame (30) about pivot axis (PA). In aspects of the disclosure where an intermediary component is used, the rotational restraint features (e.g., splines) associated with arm (22) may be different than the rotational restraint features (e.g., splines) associated with base frame (30), thereby providing various advantages. In one aspect of the disclosure, the rotational restraint features of arm (22) may be modified to enhance how many rotational positions arm (22) may achieve in the restrained configuration; while the rotational restraint features of base frame (30) may be modified to increase the overall strength of pivot restraint mechanism (70) in order to allow suitable transmission of large rotational loads from lift arm (22) onto base frame (30). FIGS. 8-11D show an alternative lift carriage (220) that may be readily incorporated into lift (10) in replacement of lift carriage (20) described above. Therefore, lift carriage (220) may be substantially similar to lift carriage (20) described above, with differences elaborated below.

Lift carriage (220) includes a base frame (230), adjustable lift arms (222) pivotally coupled to base frame (230) via a respective pivot pin (232), and a respective pivot restraint mechanism (270). As will be described in greater detail below, pivot restraint mechanism (270) is capable of selectively restraining the rotational position of lift arm (222) relative to base frame (230) about pivot axis (PA) such that lift arm (222) may be pivoted to a suitable position for engaging a structural lifting point of a vehicle's frame.

Base frame (230) is substantially similar to base frame (30) described above, with differences elaborated below. Therefore, base frame (230) includes flanges (234) defining pin holes (236), and an interior rotational stopping surface (238); which are substantially similar to flanges (34) defining pin holes (36), and rotational stopping surface (38), respectively, described above. At least a top flange (234) of base frame (230) also defines a through hole (235) associated with a respective pin hole (236). As will be described in greater detail below, through hole (235) is dimensioned to slidably receive a translating pin (252) of an actuating intermediary assembly (250) of pivot restraint mechanism (270).

Lift arm (222) is substantially similar to lift arm (22) described above, with differences elaborated below. Therefore, lift arm (222) includes collar (224), adjustable body (not shown), adapter coupling end (not shown), a pair of flanges (223) each defining a pin hole (225), and an interior rotational stopping surface (221); which may be substantially similar to collar (24), adjustable body (26), adapter coupling end (28), pair of flanges (23) each defining a pin hole (25), and interior rotational stopping surface (21), respectively, described above. It should be understood that lift carriage (220) is shown with one lift arm (222) for purposes of clarity, it should be readily understood a second lift arm (220) may be readily incorporated into lift carriage (220) in similar fashion to how lift carriage (20) includes two adjustable lift arms (22).

Restraint mechanism (270) includes an arm restraint body (272), a base frame restraint body (280), and an actuating intermediary restraint assembly (250). Restraint bodies (272, 280) are associated with a respective lift arm (222) and base frame (230), respectively. As will be described in greater detail below, pivot restraint mechanism (270) is capable of selectively restraining the rotational position of lift arm (222) relative to base frame (230) about pivot axis (PA) such that lift arm (222) may be pivoted to a suitable position for engaging a structural lifting point of a vehicle's frame. In particular, actuating intermediary assembly (250) is configured to actuate relative to both restraint bodies (272, 280) in order to selectively engage restraint body (272) to thereby rotationally fix restraint bodies (272, 280) relative to each other about pivot axis (PA). As will also be described in greater detail below, bodies (272, 280) of pivot restraint mechanism (270) (A) are completely housed between respective flanges (223, 234) defining pin holes (225, 236), and (B) substantially maintain their rotational position relative to their respective components via engagement with surfaces (221, 238) located between respective flanges (223, 234) defining pin holes (225, 236); either of which may result in a compact pivot restraint mechanism (270).

Arm restraint body (272) may be substantially similar to arm restraint body (72) described above, with differences elaborated below. While arm restraint body (72) described above includes a tapered external surface (74) having a circumferential array of splines (75); arm restraint body (272) of the current aspect of the disclosure includes a tapered internal surface (274) having a circumrenal array of splines (275). Arm restraint body (272) defines a through hole (276) dimensioned to receive a portion of an intermediary restraint body (260) and pin (232). Therefore, as shown in FIGS. 10A-11D, once assembled, arm restraint body (272) is pivotally associated with pin (232) such that arm restraint body (272) may rotate about pivot axis (PA) defined by pin (232). Additionally, restraint body (272) is coupled with pin (232) such that restraint body (272) is housed between flange (223) defining pin holes (225); which may contribute to the compact nature of pivot restraint mechanism (270). While in the current example through hole (276) is defined by a portion of arm restraint body (272) extending to form a continuous annular surface, this is merely optional. In some instances, the portion of arm restraint body (272) defining through hole (276) is not continuous, but merely sufficient to rotationally couple arm restraint body (272) with pin (232) such that arm restraint body (272) does not disassociate from pin (232) after assembly.

Tapered internal surface (274) is dimensioned received a frustoconical portion of intermediary restraint body (260) having a second array of complementary splines (264) such that splines (275, 264) may selectively engage each other. While in the current aspect of the disclosure, internal surface (274) and splines (264) of intermediary restraint body (260) are tapered, this is merely optional. In some aspects of the disclosure, internal surface (274) may extend in a cylindrical fashion, instead of in a frustoconical fashion, such that splines (275, 264) extend vertically upward along an axis parallel with a vertical axis (such as pivot axis (PA)). As will be described in greater detail below, tapered external surface (274) and/or splines (275) extending along surface (274) may be configured to suitably engage frustoconical portion of intermediary restraint body (260) and/or complementary splines (264) in order to rotationally restrain bodies (272, 280) in the restrained configuration.

Arm restraint body (272) includes a rotational stopping surface (278) that may be substantially similar to rotational stopping surface (78) described above. Rotational stopping surface (278) is dimensioned to abut against a corresponding rotational stopping surface (221) of lift arm (222) once assembled. Interaction between rotational stopping surfaces (278, 221) prevents arm restraint body (272) from rotating about pin (232) relative to lift arm (222). If lift arm (222) rotates relative to base frame (230) in accordance with the description herein, arm restraint body (272) will also rotate with lift arm (222) relative to base frame (230) due to the interaction between rotational stopping surfaces (278, 221).

Rotational stopping surface (221) of lift arm (222) acts as a connecting bracket between flanges (223) defining pin holes (225) such that rotational stopping surface (221) and flanges (223) form a U-shaped yoke end that may assist in rotationally coupling lift arm (222) with base frame (230) via pin (232). Therefore, rotational stopping surface (278) of arm restraint body (272) engages a surface (221) of lift arm (222) that is located between flanges (223) in order to rotationally fix arm restraint body (272) with lift arm (222).

In the current example, rotational stopping surfaces (278, 221) are substantially flat and planar. However, this is merely optional, as stopping surfaces (278, 221) may have any suitable geometry as would be apparent to one skilled in the art in view of the teachings herein. In some instances, there may be more than one pair of stopping surfaces (278, 221) configured to rotationally fix lift arm (222) with arm restraint body (272). In the current example, rotational stopping surface (221), located between flanges (223), acts as a connecting bracket to form a yoke with flanges (223) defining pin holes (225). However, this is merely optional, as rotational stopping surface (221) could be located at any suitable location between flanges (223) as would be apparent to one skilled in the art in view of the teachings herein.

Base frame restraint body (280) may be substantially similar to base frame restraint body (80) described above, with differences elaborated below. However, in the current example, internal surface (284) of restraint body (280) is not tapered.

Base frame restraint body (280) defines a through hole (286) dimensioned to receive a portion of intermediary restraint body (260) and pin (232). Therefore, as shown in FIGS. 10A-11D, once assembled, base frame restraint body (280) is associated with pin (232). Additionally, base frame restraint body (280) is coupled with pin (232) such that restraint body (280) is housed between flanges (234) defining pin holes (236); which may contribute to the compact nature of pivot restraint mechanism (270). While in the current example, through hole (286) is defined by a portion of base frame restraint body (280) extending to form a continuous annular surface, this is merely optional. In some instances, the portion of base frame restraint body (280) defining through hole (286) is not continuous, but merely sufficient to rotationally couple base frame restraint body (280) with pin (232) such that base frame restraint body (280) does not disassociate from pin (232) after assembly.

Internal surface (284) includes a circumferential array of splines (285) dimensioned to slidably engage a first array of complementary splines (262) of intermediary restraint body (260). Therefore, intermediary restraint body (260) may be configured to vertically actuate along pin (232) in the direction defined by pivot axis (PA) relative to base frame restraint body (280) in order for intermediary restraint body (260) to selectively disengage and engage arm restraint body (272).

Splines (262, 285) extend vertically along a respective axis that is parallel with pivot axis (PA) such that splines (262) may vertically slide relative to splines (285) of base frame restraint body (280). Splines (262, 285) complement each other such that intermediary restraint body (260) and base frame restraint body (280) are rotationally fixed relative to each other about pivot axis (PA), regardless of the vertical position intermediary restraint body (260) achieves relative to base frame restraint body (280). While splines (262, 285) are used in the current example, any other suitable structure may be used in order to inhibit rotation of bodies (260, 280) relative to each other about pivot axis (PA) of pin (232).

Rotational stopping surface (288) is dimensioned to abut against a corresponding rotational stopping surface (238) of base frame (230) once assembled. Interaction between rotational stopping surfaces (288, 238) prevents base frame restraint body (280) from rotating about pin (232) relative to base frame (230). While restraint body (80) described above may be configured to translate relative to base frame (30) in order to transition between a restrained and unrestrained configuration, restraint body (280) in the current example may be associated with base frame (230) in such a manner that restraint body (280) does not have to translate in order to transition between the restrained and unrestrained configuration.

Rotational stopping surface (238) of base frame (230) acts as a connecting bracket between flanges (234) defining pin holes (236) such that rotational stopping surface (238) and flanges (234) form a U-shaped yoke end that may assist in rotationally coupling lift arm (222) with base frame (230) via pin (232). Therefore, rotational stopping surface (288) of base frame restraint body (280) engages surface (238) of base frame (230) that is located between flanges (234) in order to rotationally fix arm restraint body (280) with base frame (230). Rotational stopping surface (238) acts as a web between flanges (234) such that rotational stopping surface (238) extends laterally between flanges (234) and defines a first pair of pin holes (236) and a second set of pin holes (236), each set configured to rotationally couple to a respective lift arm (222). In other words, rotational stopping surface (238) extends laterally to associate with two lift arms (222). The same stopping surface (238) engages a first base frame restraint body (280) of a first lift arm (222) and a second base frame restraint body (280) of a second lift arm (222). Additionally, since rotational stopping surface (238) acts as the connecting web between upper and lower flanges (234) to form a yoke, rotational stopping surface (238) faces inwards toward the area of lift (10) configured to receive a vehicle to be lifted. Having rotational stopping surface (238) act as the laterally connecting web that forms a yoke structure configured to rotationally support two lift arms (222) may allow for a simpler design of base frame (230), as compared to adding support gussets to base frame (230) to act as rotational stopping surfaces.

If lift arm (222) rotates relative to base frame (230) in accordance with the description herein, base frame restraint body (280) will remain rotationally fixed about pivot axis (PA) relative to base frame (230) due to the interaction between rotational stopping surfaces (288, 238).

Therefore, restraint body (280) may be rotationally fixed relative to base frame (230) about the pivot axis (PA) of pin (232) during assembly so long as rotational stopping surfaces (288, 238) are suitably aligned when pin (232) is inserted through pins holes (225, 236) and through hole (286) during assembly. In the current example, rotational stopping surfaces (238, 288) are substantially flat and planar. However, this is merely optional, as stopping surfaces (238, 288) may have any suitable geometry as would be apparent to one skilled in the art in view of the teachings herein. In some instances, there may be more than one pair of stopping surfaces (238, 288) configured to rotationally fix base frame (230) with restraint body (280). In the current example, rotational stopping surface (238) located between flanges (234) acts as a connecting bracket to form a yoke with flanges (234) defining pin holes (236). However, this is merely optional, as rotational stopping surface (238) could be located at any suitable location between flanges (234) as would be apparent to one skilled in the art in view of the teachings herein. As another example, rotational stopping surface (238) may be welded or otherwise fixed to rotational stopping surface (288), while rotational stopping surface (278) may be welded or otherwise fixed to rotational stopping surface (221).

As mentioned above, pivot restraint mechanism (270) includes an intermediary assembly (250) configured to actuate relative to both restraint bodies (272, 280) in order to selectively engage restraint body (272) to thereby rotationally fix restraint bodies (272, 280) relative to each other about pivot axis (PA). Since restraint bodies (272, 280) are rotationally fixed relative to their respective lift arm (222) and base frame (230), when restraint bodies (272, 280) are rotationally fixed relative to each other, so are lift arm (222) and base frame (230).

Intermediary assembly (250) include a translating pin (252), a pull ring (254), a bias spring (256), a coupling bracket (258), and intermediary restraint body (260) defining a pin through hole (266) and having first array of complementary splines (262) and second array of complementary splines (264). Translating pin (252) is slidably attached to base frame (230) via through hole (235), while bias spring (256) biases actuating intermediary assembly (250) relative to base frame (230) such that pivot restraint mechanism (270) is biased toward the restrained configuration. Pull ring (254) provides access such that a user may actuate pull ring (254) upward, thereby actuating intermediary assembly (250) from the restrained configuration into the unrestrained configuration in accordance with the description herein.

Coupling bracket (258) extends between translating pin (252) and intermediary restraint body (260) such that intermediary restraint body (260) and translating pin (252) are fixed relative to each other. Therefore, as translating pin (252) and intermediary restraint body (260) actuate relative to base frame (230) and other restraint bodies (272, 280) in accordance with the description herein, intermediary restraint body (260) also actuates relative to base frame (230) via engagement with coupling bracket (258).

As mentioned above, intermediary restraint body (260) includes first array of complementary splines (262) and second array of complementary splines (264), each configured to respectively engage base frame restraint body (280) and arm restraint body (272). As mentioned above, the splines (264) associated with arm (222) may be different from splines (262) associated with base frame (230) in order to provide various advantages.

First array of complementary splines (262) and splines (285) of base frame restraint body (280) maintain suitable engagement with each other such that intermediary body (260), base frame restraint body (280), and base frame (230) remain rotationally fixed relative to each other. Therefore, as intermediary restraint body (260) actuates relative to base frame restrain body (280) in accordance with the description herein, splines (262, 285) do not disengage from each other such that intermediary body (260) and base frame restraint body (280) remain rotationally fixed relative to each other. As a result, splines (262, 285) may be thicker than splines (275) of arm restraint body (272) and respective complementary splines (264). With thicker splines (262, 285), the height of splines (262) may be reduced while still maintaining a suitable strength of pivot restrain mechanism (270), thereby allowing for a more compact pivot restraint mechanism (270). Additionally, thicker splines (262, 285) may also increase the overall strength of pivot restraint mechanism (270) in order to allow larger transmission of rotational loads from lift arm (222) onto base frame (230).

Second array of complementary splines (264) and splines (275) of arm restraint body (272) are thinner compared to splines (262, 285), thereby allowing arm (222) to rotate into more rotational positions while in the restrained configuration. Additionally, the tapered nature of splines (264, 275) may allow for longer splines (262, 285) while maintaining a compact configuration. Thinner splines (262, 285) may be configured to allow arm (222) to rotate into various restrained configurations that are, for example, rotationally spaced three degrees from each other. Of course, any other suitable rotational spacing may be used as would be apparent to one skilled in the art in view of the teachings herein.

Intermediary restraint body (260) is contained within both through holes (276, 286) of respective restraint bodies (272, 280). First array of complementary splines (262) is slidably engaged with splines (285) of base frame restraint body (280), thereby rotationally fixing intermediary restraint body (260) with base frame restraint body (280) while allowing intermediary restraint body (260) to transition between the restrained configuration and the unrestrained configuration. Intermediary restraint body (260) is also contained within both through holes (276, 286) such that second array of complementary splines (264) are directly adjacent to splines (275) of arm restraint body (272).

In the restrained configuration (as shown in FIGS. 10A, 10D, 11A, and 11D) second array of complementary splines (264) engage splines (275) of arm restraint body (272), thereby rotationally fixing lift arm (222) relative to base frame (230) via engagement between restraint bodies (272, 260, 280). In the unrestrained configuration (as shown in FIGS. 10B, 10C, 11B, and 11C) second array of complementary splines are disengaged from splines (275) of arm restraint body (272), thereby allowing rotation of lift arm (222) relative to base frame (230) such that lift arm (222) may be suitably position relative to vehicle in accordance with the description herein. Therefore, a user may pull on ring (254) to thereby actuate translating pin (252) and intermediary restraint body (260) into the unrestrained configuration in order to rotate lift arm (222) into a desired position. Once the desired rotation position is achieved, the user may release pull ring (254) such that spring (256) biases translating pin (252) back toward the restrained configuration, thereby driving intermediary restraint body (260) such that second array of complementary splines (264) suitably engages splines (275) of arm restraint body (272).

While is the current example, actuating intermediary assembly (250) selectively engages arm restraint body (272) to rotationally fix restraint bodies (272, 280); it should be understood that intermediary assembly (250) may associated with lift arm (222) and be configured to selectively engage base frame restraint body (280) in order to rotationally fix restraint bodies (272, 280).

Pin through hole (266) is dimensioned to receive pin (232). While in the current example, through hole (266) is defined by a portion of intermediary restraint body (260) extending to form a continuous annular surface, this is merely optional. In some instances, the portion of intermediary restraint body (260) defining through hole (286) is not continuous, but merely sufficient to rotationally couple intermediary restraint body (260) with pin (232) such that intermediary restraint body (260) does not disassociate from pin (232) after assembly.

Figure 10A:
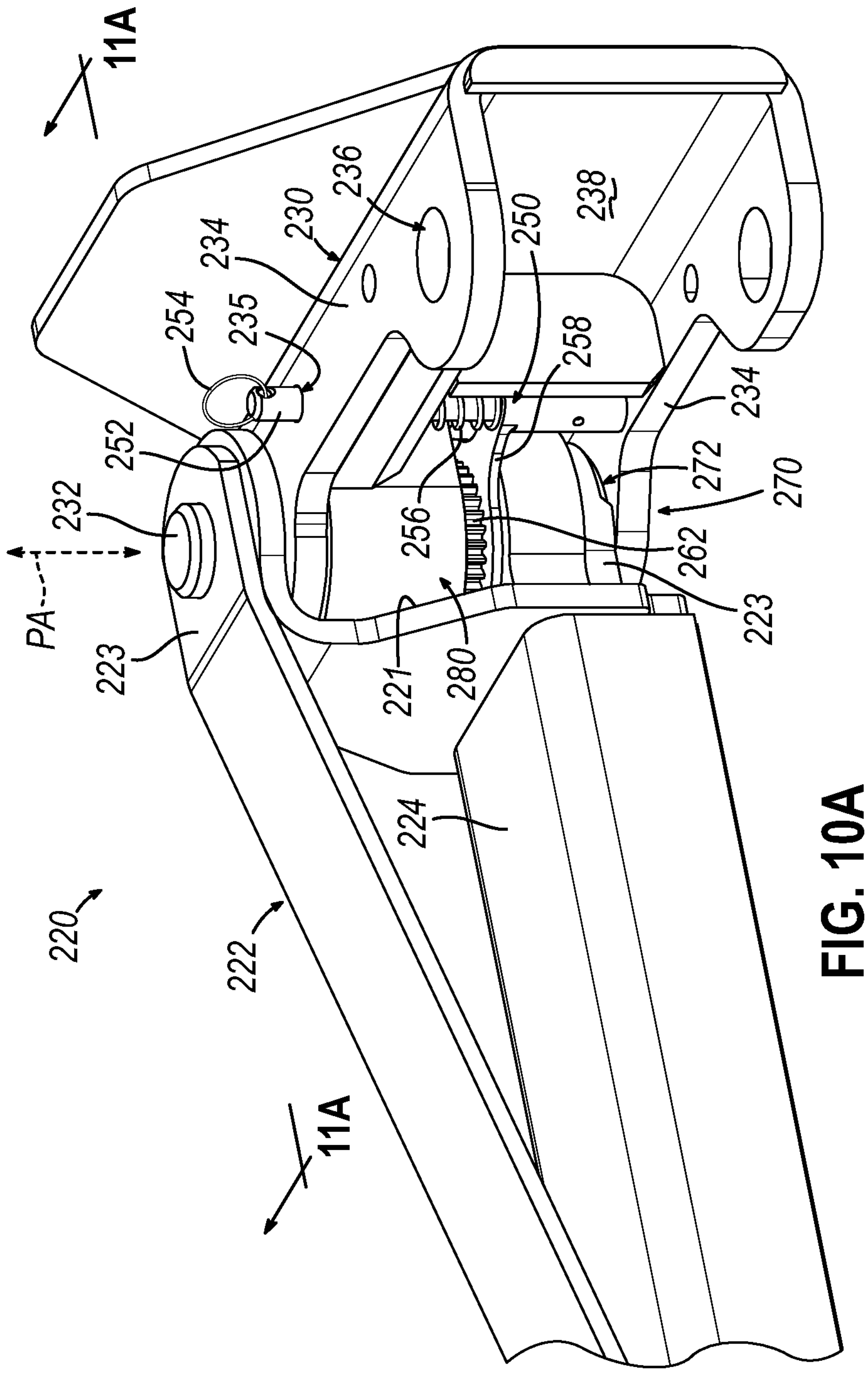
FIG. 10A is a perspective view of the adjustable lift arm of FIG. 8 in a first rotational position relative to the base frame of FIG. 8, with the pivot restraint mechanism of FIG. 8 in a restrained configuration.
Figure 10B:
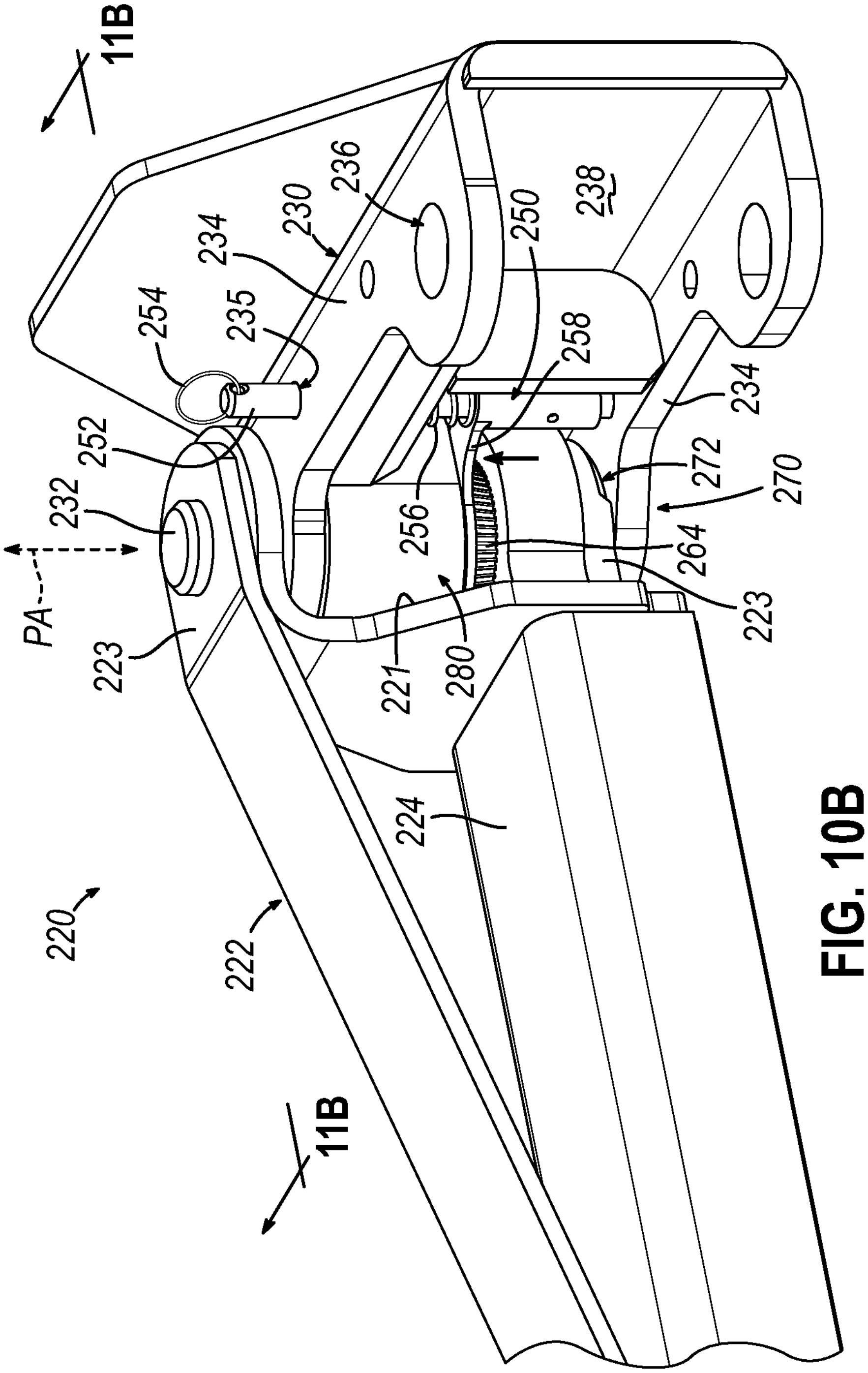
FIG. 10B is a perspective view of the adjustable lift arm of FIG. 8 in the first rotational position relative to the base frame of FIG. 8, with the pivot restraint mechanism of FIG. 8 in an unrestrained configuration.
Figure 10C:
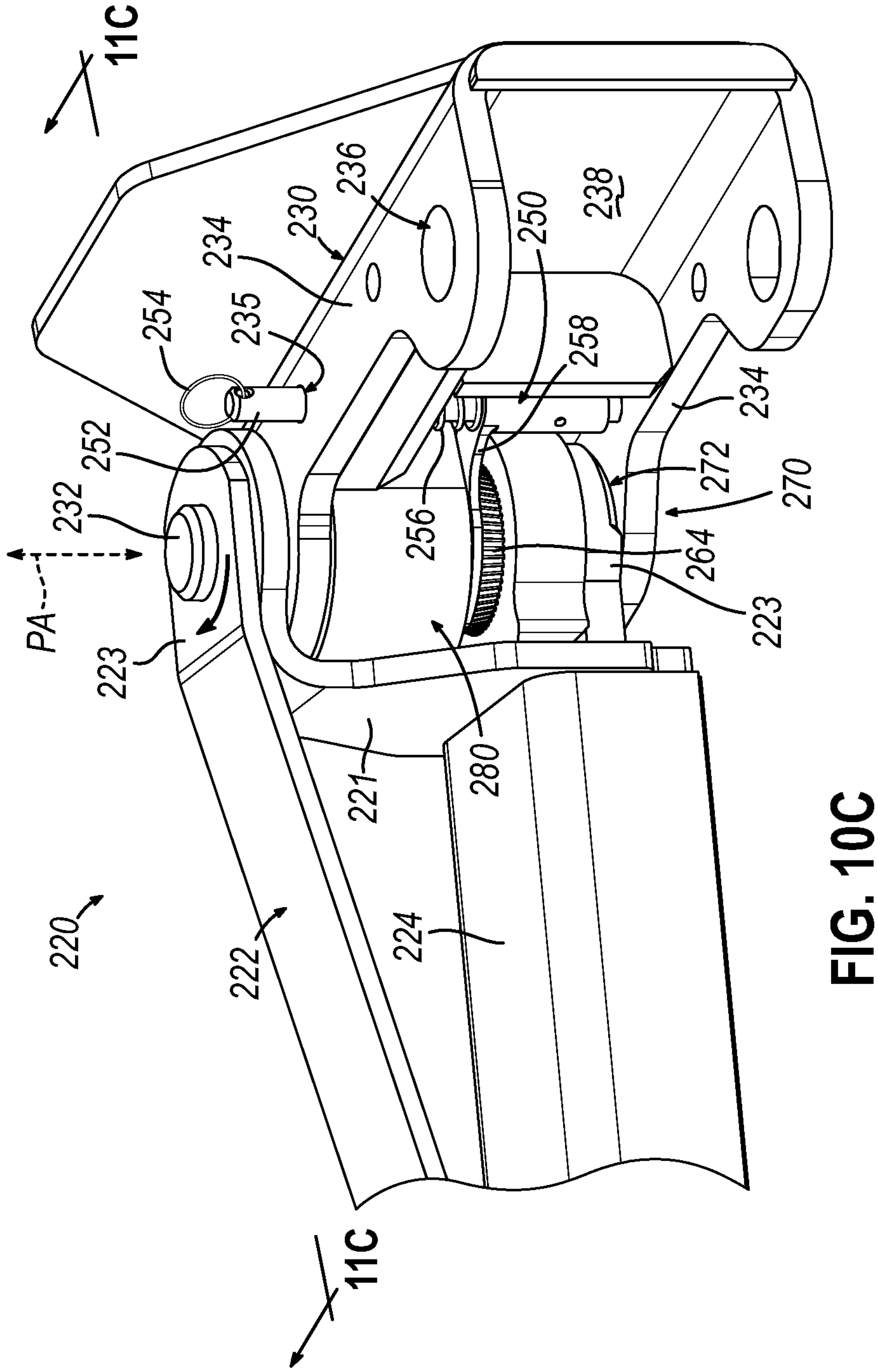
FIG. 10C is a perspective view of the adjustable lift arm of FIG. 8 in a second rotational position relative to the base frame of FIG. 8, with the pivot restraint mechanism of FIG. 8 in the unrestrained configuration.

FIGS. 10A-11D show an illustrative use of restraint mechanism (270) to pivot lift arm (222) relative to base frame (230) between two rotational positions. First, as shown in FIGS. 10A and 11A, restraint mechanism (270) may be in the restrained configuration such that second array of complementary splines (264) are engaged with splines (275). In the position shown in FIGS. 10A and 11A, such engagement inhibits rotation of bodies (272, 280) relative to each other in accordance with the description herein.

Figure 11A:
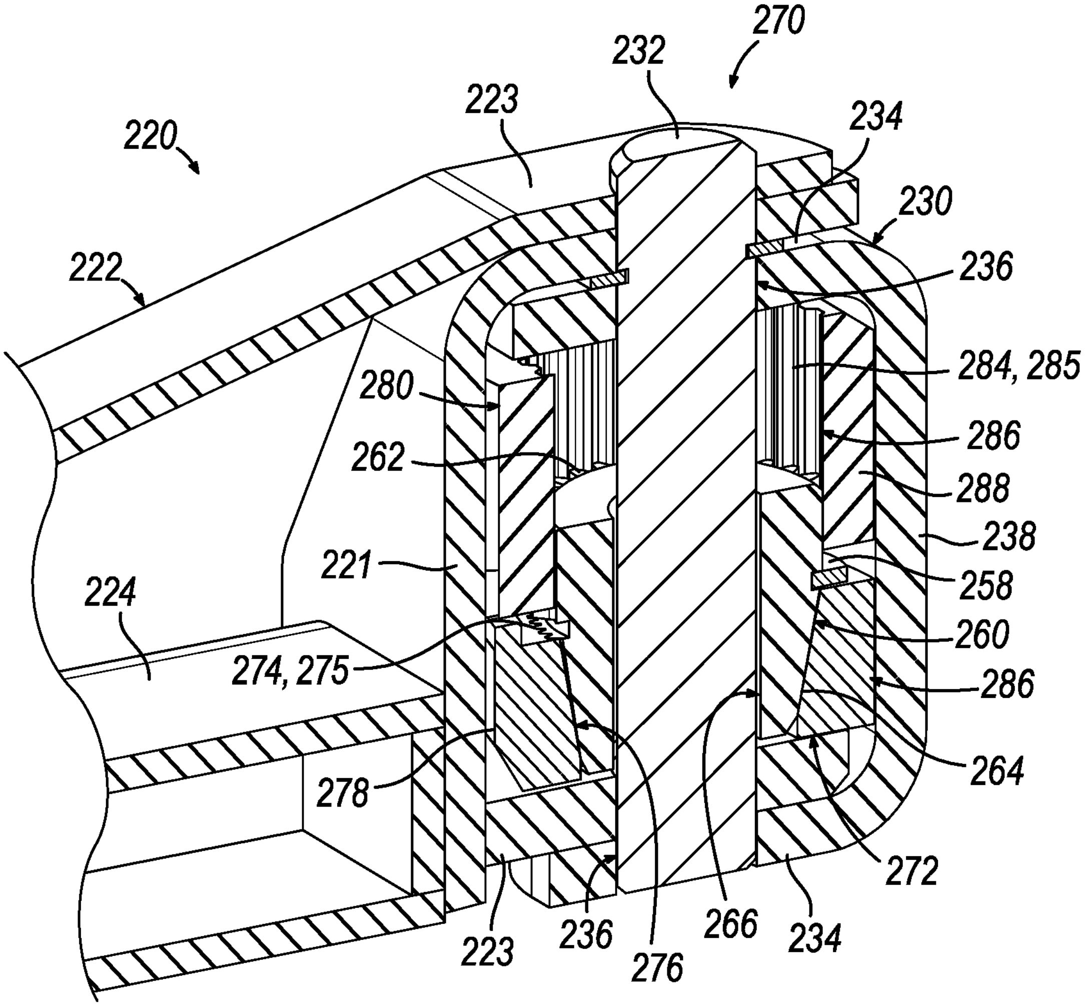
FIG. 11A is a sectional view, taken along line 11A-11A of FIG. 10A, of the adjustable lift arm of FIG. 8 in the first rotational position relative to the base frame of FIG. 8, with the pivot restraint mechanism of FIG. 8 in the restrained configuration.
Figure 11B:
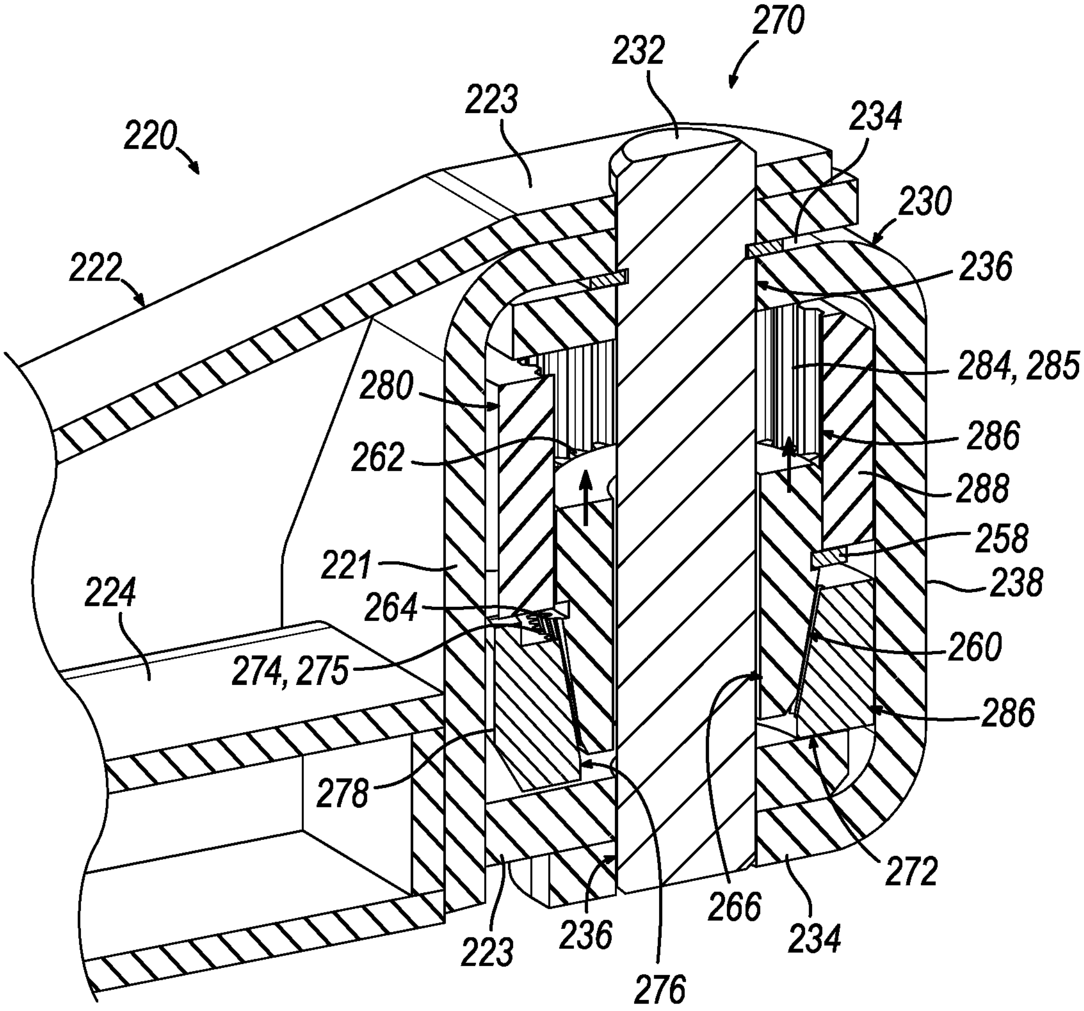
FIG. 11B is a sectional view, taken along line 11B-11B of FIG. 10B, of the adjustable lift arm of FIG. 8 in the first rotational position relative to the base frame of FIG. 8, with the pivot restraint mechanism of FIG. 8 in the unrestrained configuration.
Figure 11C:
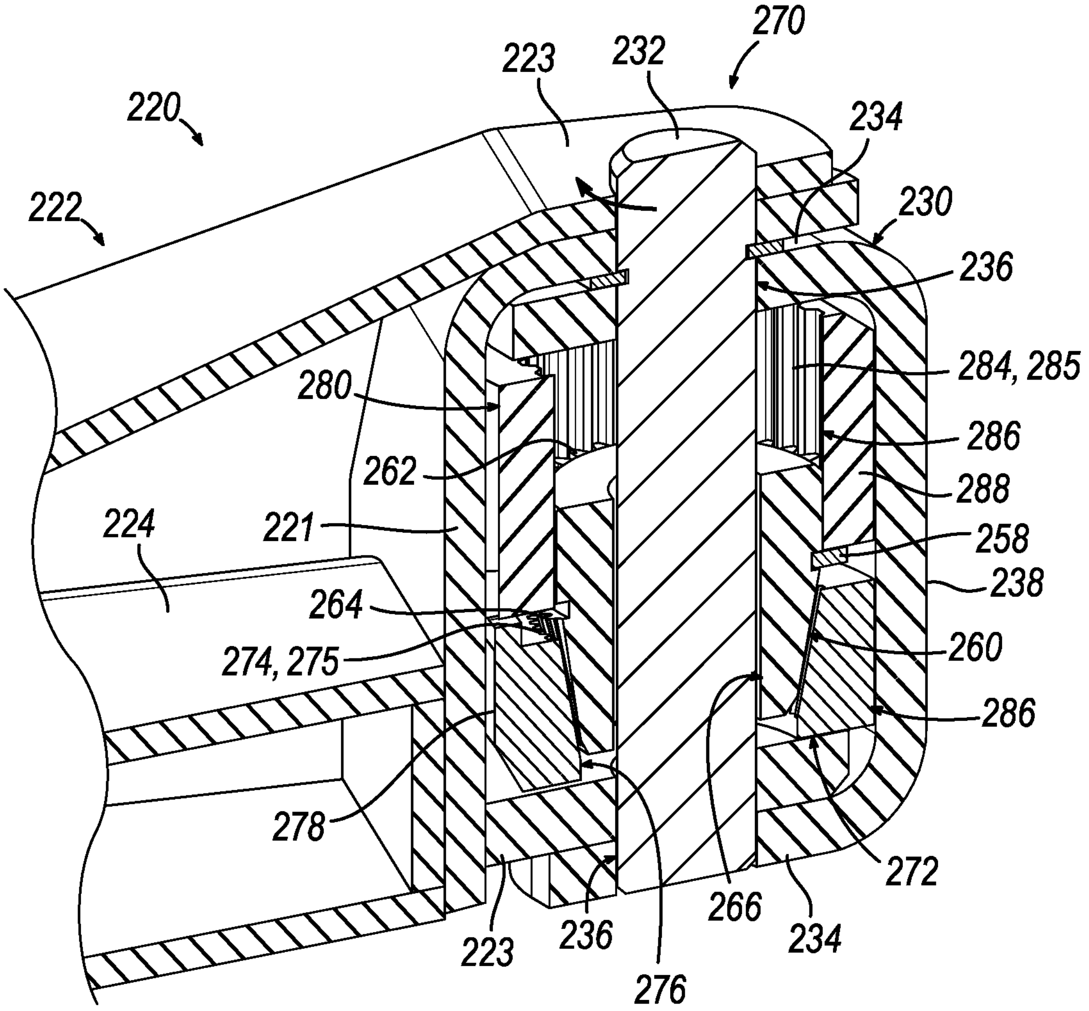
FIG. 11C is a sectional view, taken along line 11C-11C of FIG. 10C, of the adjustable lift arm of FIG. 8 in the second rotational position relative to the base frame of FIG. 8, with the pivot restraint mechanism of FIG. 8 in the unrestrained configuration.

Since restraint surfaces (278, 221) are abutting against each other, and since restraint surfaces (288, 238) are abutting against each other, arm restraint body (272) is rotationally fixed to lift arm (222) while frame restraint body (280) is rotationally fixed relative to base frame (230). Therefore, when intermediary restraint body (260) rotationally fixes the other restraint bodies (272, 280) relative to each other as shown in FIGS. 10A and 11A, lift arm (222) may be inhibited from rotating about pivot axis (PA) relative to base frame (230). The engagement between (A) restraint surfaces (278, 221), (B) restraint surfaces (288, 238), (C) splines (275, 264) and (D) splines (285, 262) may further improve strength of pivot restraint mechanism (270), enabling it to withstand large rotational loads acting on lift arms (222) while still inhibiting rotation of lift arm (222) about pivot axis (PA).

If an operator desires to rotate lift arm (222), the operator may vertically actuate translating pin (252) and intermediate restraint body (260) upward such that splines (264, 275) are no longer directly adjacent to each other, thereby actuating restraint mechanism (270) into the unrestrained configuration, as shown between FIGS. 10A-10B and 11A-11B. The tapered nature of spline (264, 275) may allow for splines (264, 275) to disengage with each other in response to intermediate restraint body (260) moving a small distance relative to arm restraint body (272).

Figure 10D:
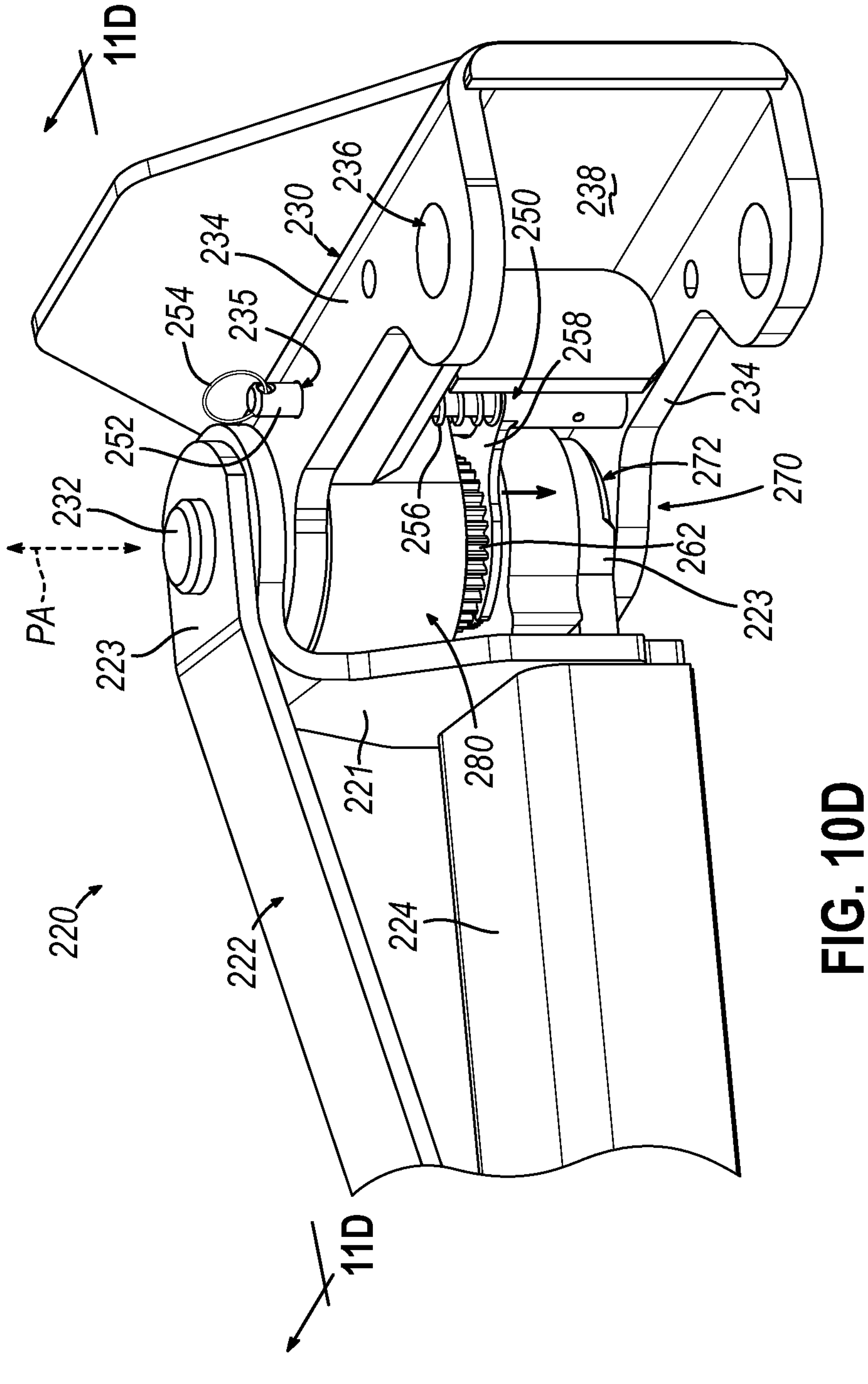
FIG. 10D is a perspective view of the adjustable lift arm of FIG. 8 in the second rotational position relative to the base frame of FIG. 8, with the pivot restraint mechanism of FIG. 8 in the restrained configuration.
Figure 11D:
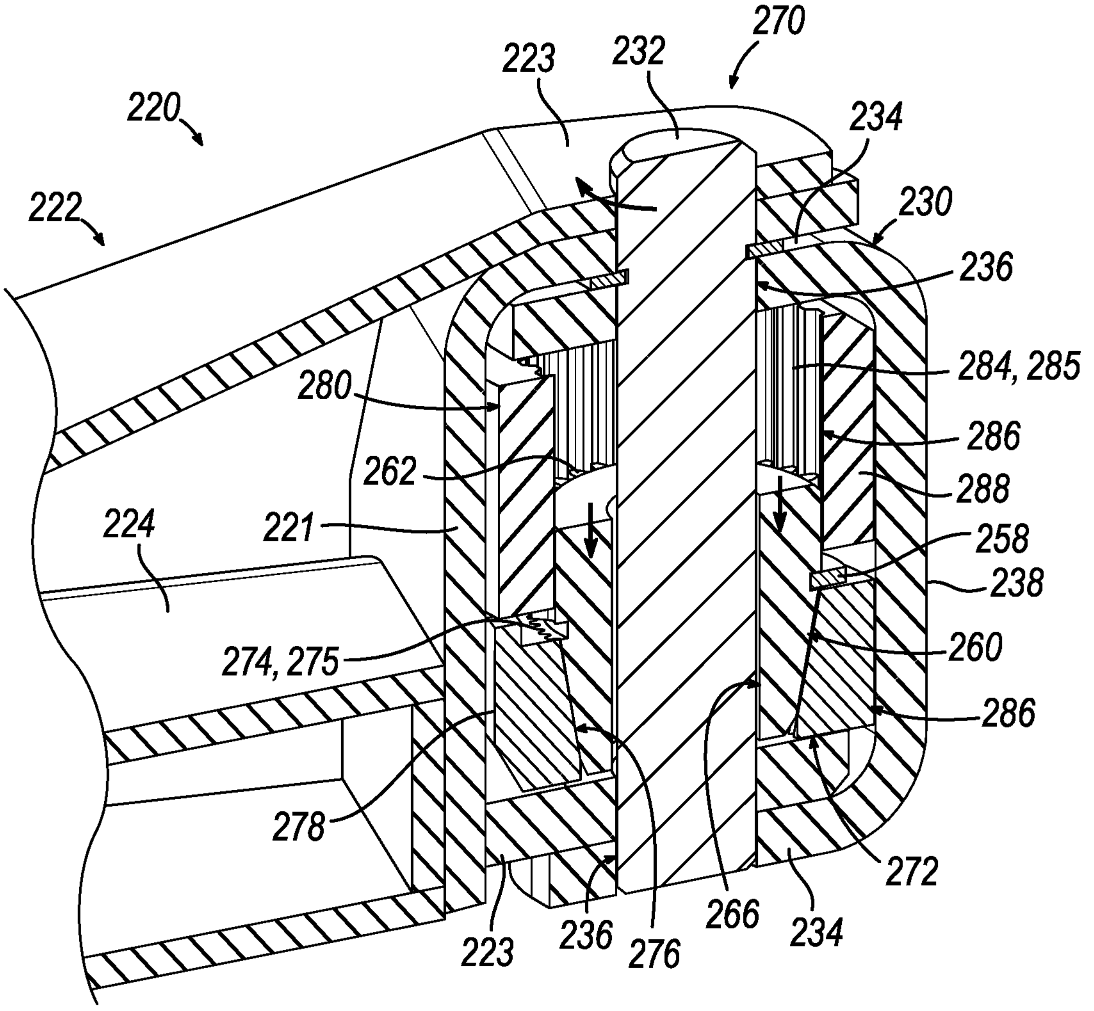
FIG. 11D is a sectional view, taken along line 11D-11D of FIG. 10D, of the adjustable lift arm of FIG. 8 in the second rotational position relative to the base frame of FIG. 8, with the pivot restraint mechanism of FIG. 8 in the restrained configuration.

As shown between FIGS. 10B-10C and 11B-11C, with restraint mechanism (270) in the unrestrained configuration, the operator may rotate arm (222) relative to base frame (230) about pivot axis (PA) in order to position arm (222) into a suitable rotational position to engage vehicle in accordance with the description herein. Next, as shown in FIGS. 10D and 11D, the operator may release pull ring (254) such that spring (256) biases restraint body (260) back into the restrained configuration such that further rotation of lift arm (222) relative to base frame (230) is inhibited. Since pivot restraint mechanism (270) is housed between flanges (223, 234) defining pin holes (225, 236), pivot restraint mechanism (270) may be compactly stored, thereby reducing the chances of acting as an obstruction on the shop floor.

D. Fourth Illustrative Rotational Restraint Assembly

As mentioned above, the internal surface (274) of arm restraint body (272) and splines of intermediary restraint body (260) are tapered, thereby allowing disengagement of splines (264, 275) in response to small movement between arm restraint body (272) and intermediary restraint body (260). Therefore, the tapered nature of splines (264, 275) may allow for a more compact design of restraint mechanism (270). However, in some aspects of the disclosure, it may be desirable to utilize splines that are not tapered (e.g., extend vertically upward parallel with a vertical axis, pivot axis (PA), etc.), as it may be easier and/or less expensive to manufacture engagement splines (265, 275) that are not tapered.

However, utilizing splines that are not tapered may require intermediate restraint body (260) to travel a further vertical distance relative to arm restraint body (272) in order to suitably disengage splines (265, 275) in accordance with the description above. Utilization of such splines may undesirably increase the size of restraint mechanism (270) and/or decrease the compact nature of restraint mechanism (270) while in the unrestrained configuration. Therefore, in some aspects of the disclosure, it may be desirable to utilize splines that do not include a taper (e.g., vertically extending splines that extend parallel with a vertical axis, pivot axis (PA), etc.) while also decreasing the travel distance required for intermediate body (260) to transition between the retrained and unrestrained maintaining the compact nature of restraint mechanism (270).

Figure 12:
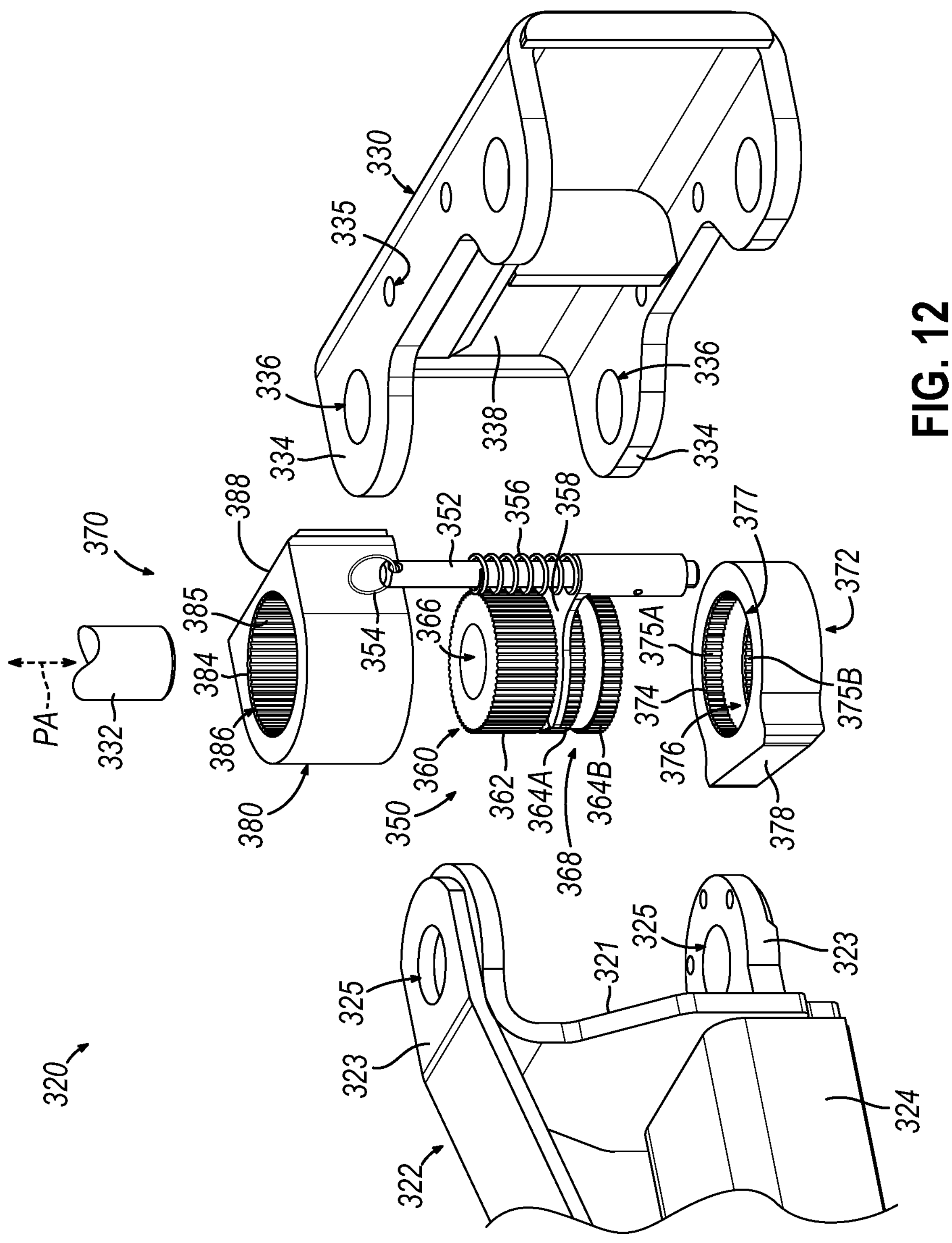
FIG. 12 is an exploded perspective view of an alternative adjustable arm, an alternative base frame, and an alternative pivot restraint mechanism.

FIG. 12 shows an alternative lift carriage (320) that may be readily incorporated into lift (10) in replacement of lift carriage (20, 220) described above. Therefore, lift carriage (320) may be substantially similar to lift carriage (20, 220) described above, with differences elaborated below. Lift carriage (320) includes a base frame (330), adjustable lift arms (322) pivotally coupled to base frame (330) via a respective pivot pin (332), and a respective pivot restraint mechanism (370) capable of selectively restraining the rotational position of lift arm (322) relative to base frame (330) about pivot axis (PA) such that lift arm (322) may be pivoted to a suitable position for engaging a structural lifting point of a vehicle's frame.

Base frame (330) is substantially similar to base frame (230) described above, with differences elaborated below. Therefore, base frame (330) includes flanges (334) defining pin holes (336) and through hole(s) (335), as well as an interior rotational stopping surface (338); which may be substantially similar to flanges (234), pin holes (236), through hole(s) (235), and interior rotational stopping surface (238) described above.

Lift arm (322) is substantially similar to lift arm (222) described above, with differences elaborated below. Therefore, lift arm (322) includes collar (324), adjustable body (not shown), adapter coupling end (not shown), a pair of flanges (323) each defining a pin hole (325), and an interior rotational stopping surface (321); which may be substantially similar to collar (224), adjustable body (not shown), adapter coupling end (not shown), pair of flanges (223), pin holes (225), and interior rotational stopping surface (221) described above with differences elaborated below.

Restraint mechanism (370) includes an arm restraint body (372), a base frame restraint body (380), and an actuating intermediary restraint assembly (350); which may be substantially similar to arm restraint body (272), base frame restraint body (280), and actuating intermediary restraint assembly (250) descried above, respectively, with differences elaborated below. Therefore, restraint bodies (372, 380) are associated with a respective lift arm (322) and base frame (330), respectively, while intermediary restraint assembly (350) is configured to selectively rotationally fix restraint bodies (372, 380) relative to each other to thereby restrain the rotational position of lift arm (322) relative to base frame (330) about pivot axis (PA). As will also be described in greater detail below, bodies (372, 380) of pivot restraint mechanism (370) (A) are completely housed between respective flanges (323, 334) defining pin holes (325, 336), and (B) substantially maintain their rotational position relative to their respective components via engagement with surfaces (321, 338) located between respective flanges (323, 334) defining pin holes (325, 336); either of which may result in a compact pivot restraint mechanism (370).

Arm restraint body (372) may be substantially similar to arm restraint body (272) described above, with differences elaborated below. Therefore, arm restraint body (372) defines a through hole (376) dimensioned to receive a portion of an intermediary restraint body (360) and pin (332). Therefore, once assembled, arm restraint body (372) is pivotally associated with pin (332) such that arm restraint body (372) may rotate about pivot axis (PA) defined by pin (332). Additionally, restraint body (372) is coupled with pin (332) such that restraint body (372) is housed between flange (323) defining pin holes (325); which may contribute to the compact nature of pivot restraint mechanism (370). While in the current example through hole (376) is defined by a portion of arm restraint body (372) extending to form a continuous annular surface, this is merely optional. In some instances, the portion of arm restraint body (372) defining through hole (376) is not continuous, but merely sufficient to rotationally couple arm restraint body (372) with pin (332) such that arm restraint body (372) does not disassociate from pin (332) after assembly.

Unlike arm restraint body (272) described above, internal surface (374) is not tapered in a general frustoconical shape. Therefore, the manufacturing of arm restraint body (272) may be simplified and/or less expensive as compared to a restraint body that includes a tapered internal surface. Internal surface (374) includes a top annular array of splines (375A) and a bottom annular array of splines (375B) spaced away from each other a suitable distance. Each spline in the array of splines (375A, 375B) extends in a vertical fashion along a respective axis that is parallel with pivot axis (PA). Internal surface (374) also defines an intermediary recessed annular pocket (377) that is interposed between annular array of splines (375A, 375B). As will be described in greater detail below, splines (375A, 375B) are configured to suitably engage a respective spline forming complementary annular array of splines (364A, 364B) of intermediary restraint body (360) in order to rotationally restrain bodies (372, 380) in the restrained configuration. As will also be described in greater detail below, annular pocket (377) is dimensioned to house a lower annular array of splines (364B) of intermediary restrain body (360) in the unrestrained configuration to thereby allow rotational movement of bodies (372, 380) relative to each other.

Arm restraint body (372) includes a rotational stopping surface (378) that may be substantially similar to rotational stopping surface (278) described above. Rotational stopping surface (378) is dimensioned to abut against a corresponding rotational stopping surface (321) of lift arm (322) once assembled. Interaction between rotational stopping surfaces (378, 321) prevents arm restraint body (372) from rotating about pin (332) relative to lift arm (322). If lift arm (322) rotates relative to base frame (330) in accordance with the description herein, arm restraint body (372) will also rotate with lift arm (322) relative to base frame (330) due to the interaction between rotational stopping surfaces (378, 321).

Rotational stopping surface (321) of lift arm (322) acts as a connecting bracket between flanges (323) defining pin holes (325) such that rotational stopping surface (321) and flanges (323) form a U-shaped yoke end that may assist in rotationally coupling lift arm (322) with base frame (330) via pin (332). Therefore, rotational stopping surface (378) of arm restraint body (372) engages a surface (321) of lift arm (322) that is located between flanges (323) in order to rotationally fix arm restraint body (372) with lift arm (322).

In the current example, rotational stopping surfaces (378, 321) are substantially flat and planar. However, this is merely optional, as stopping surfaces (378, 321) may have any suitable geometry as would be apparent to one skilled in the art in view of the teachings herein. In some instances, there may be more than one pair of stopping surfaces (378, 321) configured to rotationally fix lift arm (322) with arm restraint body (372). In the current example, rotational stopping surface (321), located between flanges (323), acts as a connecting bracket to form a yoke with flanges (323) defining pin holes (325). However, this is merely optional, as rotational stopping surface (321) could be located at any suitable location between flanges (223) as would be apparent to one skilled in the art in view of the teachings herein.

Base frame restraint body (380) may be substantially similar to base frame restraint body (280) described above, with differences elaborated below. Base frame restraint body (380) defines a through hole (386) dimensioned to receive a portion of intermediary restraint body (360) and pin (332). Therefore, once assembled, base frame restraint body (380) is associated with pin (332). Additionally, base frame restraint body (380) is coupled with pin (332) such that restraint body (283) is housed between flanges (334) defining pin holes (336); which may contribute to the compact nature of pivot restraint mechanism (370). While in the current example, through hole (386) is defined by a portion of base frame restraint body (380) extending to form a continuous annular surface, this is merely optional. In some instances, the portion of base frame restraint body (380) defining through hole (386) is not continuous, but merely sufficient to rotationally couple base frame restraint body (380) with pin (332) such that base frame restraint body (380) does not disassociate from pin (332) after assembly.

Internal surface (384) includes a circumferential array of splines (385) dimensioned to slidably engage a top array of complementary splines (362) of intermediary restraint body (360). Therefore, intermediary restraint body (360) may be configured to vertically actuate along pin (332) in the direction defined by pivot axis (PA) relative to base frame restraint body (380) in order for intermediary restraint body (360) to selectively disengage and engage arm restraint body (372).

Splines (362, 385) extend vertically along a respective axis that is parallel with pivot axis (PA) such that splines (362) may vertically slide relative to splines (385) of base frame restraint body (380). Splines (362, 385) complement each other such that intermediary restraint body (360) and base frame restraint body (380) are rotationally fixed relative to each other about pivot axis (PA), regardless of the vertical position intermediary restraint body (360) achieves relative to base frame restraint body (380). While splines (362, 385) are used in the current example, any other suitable structure may be used in order to inhibit rotation of bodies (360, 380) relative to each other about pivot axis (PA) of pin (332).

Rotational stopping surface (388) is dimensioned to abut against a corresponding rotational stopping surface (338) of base frame (330) once assembled. Interaction between rotational stopping surfaces (388, 338) prevents base frame restraint body (380) from rotating about pin (332) relative to base frame (330). Restraint body (380) in the current example may be associated with base frame (330) in such a manner that restraint body (380) does not have to translate in order to transition between the restrained and unrestrained configuration.

Rotational stopping surface (338) of base frame (330) acts as a connecting bracket between flanges (334) defining pin holes (336) such that rotational stopping surface (338) and flanges (334) form a U-shaped yoke end that may assist in rotationally coupling lift arm (322) with base frame (330) via pin (332). Therefore, rotational stopping surface (388) of base frame restraint body (380) engages surface (338) of base frame (330) that is located between flanges (334) in order to rotationally fix arm restraint body (380) with base frame (330).

If lift arm (322) rotates relative to base frame (330) in accordance with the description herein, base frame restraint body (380) will remain rotationally fixed about pivot axis (PA) relative to base frame (330) due to the interaction between rotational stopping surfaces (378, 321).

Therefore, restraint body (380) may be rotationally fixed relative to base frame (330) about the pivot axis (PA) of pin (332) during assembly so long as rotational stopping surfaces (378, 321) are suitably aligned when pin (232) is inserted through pins holes (325, 336) and through hole (386) during assembly. In the current example, rotational stopping surfaces (338, 388) are substantially flat and planar. However, this is merely optional, as stopping surfaces (338, 388) may have any suitable geometry as would be apparent to one skilled in the art in view of the teachings herein. In some instances, there may be more than one pair of stopping surfaces (338, 388) configured to rotationally fix base frame (330) with restraint body (380). In the current example, rotational stopping surface (338) located between flanges (334) acts as a connecting bracket to form a yoke with flanges (334) defining pin holes (336). However, this is merely optional, as rotational stopping surface (338) could be located at any suitable location between flanges (334) as would be apparent to one skilled in the art in view of the teachings herein. For example, rotational stopping surface (328) may be a planar projection or stiffening extending from surface (338) that forms the U-shaped yoke with flanges (334). As another example, rotational stopping surface (338) may be welded or otherwise fixed to rotational stopping surface (388), while rotational stopping surface (378) may be welded or otherwise fixed to rotational stopping surface (321).

As mentioned above, pivot restraint mechanism (370) includes an intermediary assembly (350) configured to actuate relative to both restraint bodies (372, 380) in order to selectively engage restraint body (372) to thereby rotationally fix restraint bodies (372, 380) relative to each other about pivot axis (PA). Since restraint bodies (372, 380) are rotationally fixed relative to their respective lift arm (322) and base frame (330), when restraint bodies (372, 380) are rotationally fixed relative to each other, so are lift arm (322) and base frame (330).

Intermediary assembly (350) include a translating pin (352), a pull ring (354), a bias spring (356), a coupling bracket (358), and intermediary restraint body (360) defining a pin through hole (366) and having a top annular array of complementary splines (362), an intermediate annular array of complementary splines (364A), and a bottom annular array of complementary splines (364B). Translating pin (352) is slidably attached to base frame (330) via through hole (335), while bias spring (356) biases actuating intermediary assembly (350) relative to base frame (330) such that pivot restraint mechanism (370) is biased toward the restrained configuration. Pull ring (354) provides access such that a user may actuate pull ring (354) upward, thereby actuating intermediary assembly (350) from the restrained configuration into the unrestrained configuration in accordance with the description herein.

Coupling bracket (358) extends between translating pin (352) and intermediary restraint body (360) such that intermediary restraint body (360) and translating pin (352) are fixed relative to each other. Therefore, as translating pin (352) and intermediary restraint body (360) actuate relative to base frame (330) and other restraint bodies (372, 380) in accordance with the description herein, intermediary restraint body (360) also actuates relative to base frame (330) via engagement with coupling bracket (358).

Figure 13A:
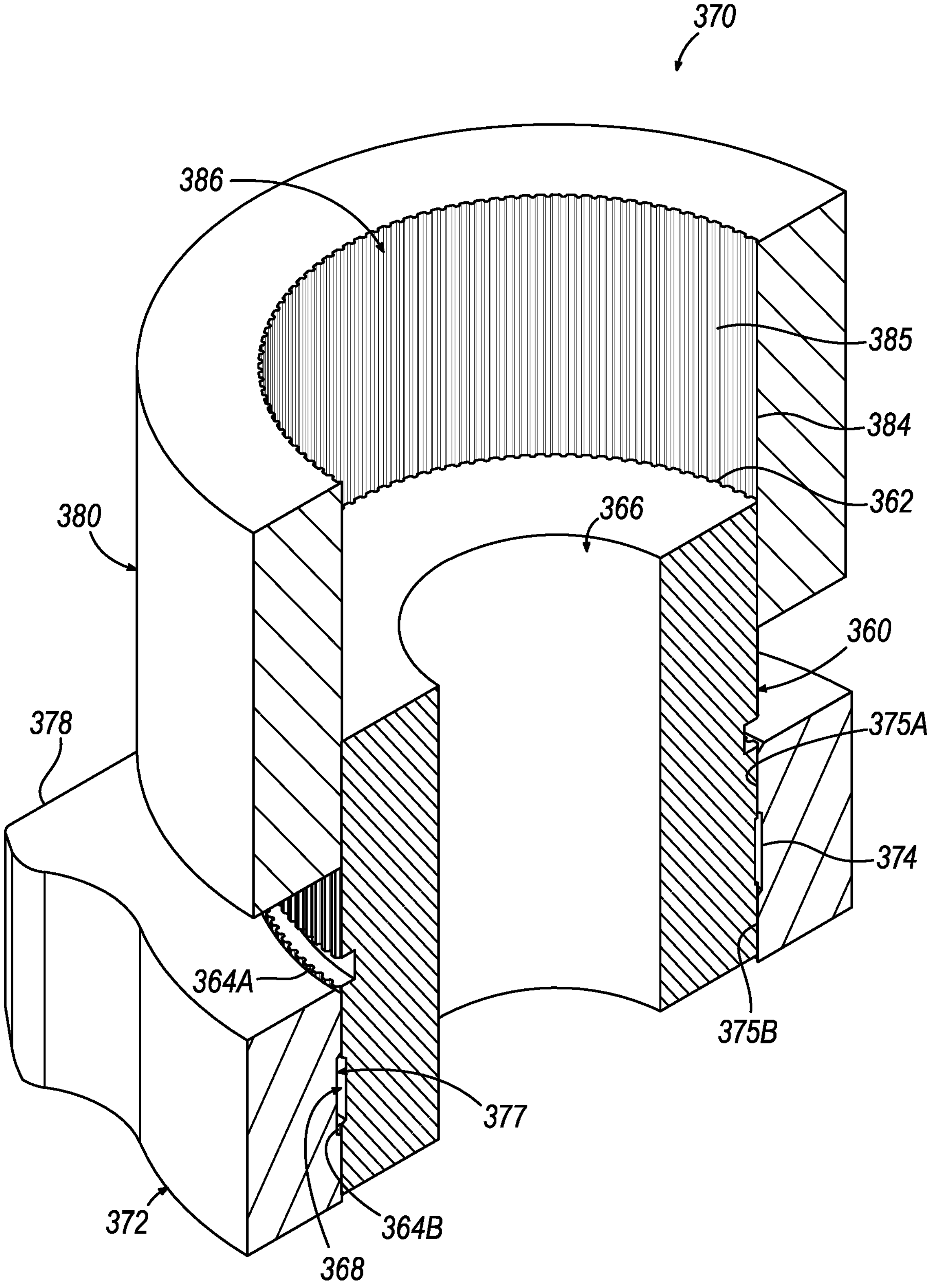
FIG. 13A is a sectional view of a portion of the pivot restraint mechanisms of FIG. 12 in a restrained configuration, with portions omitted for purposes of clarity.

As mentioned above, intermediary restraint body (360) includes top annular array of complementary splines (362), intermediate annular array of complementary splines (364A), and bottom annular array of complementary splines As mentioned above, arm restraint mechanism (370) is biased toward the retrained configuration as shown in FIG. 13A by bias spring (356). In the restrained configuration, splines (362, 364A, 364B) of intermediary body (360) are suitably engaged with respective splines (385, 375A, 375B), thereby rotationally restraining arm (322) and arm restraining body (372) from pivoting relative to base frame (330) and base frame retraining body (380) in accordance with the teachings herein. Additionally, in the retrained configuration, pockets (368, 377) are directly adjacent to one another.

Figure 13B:
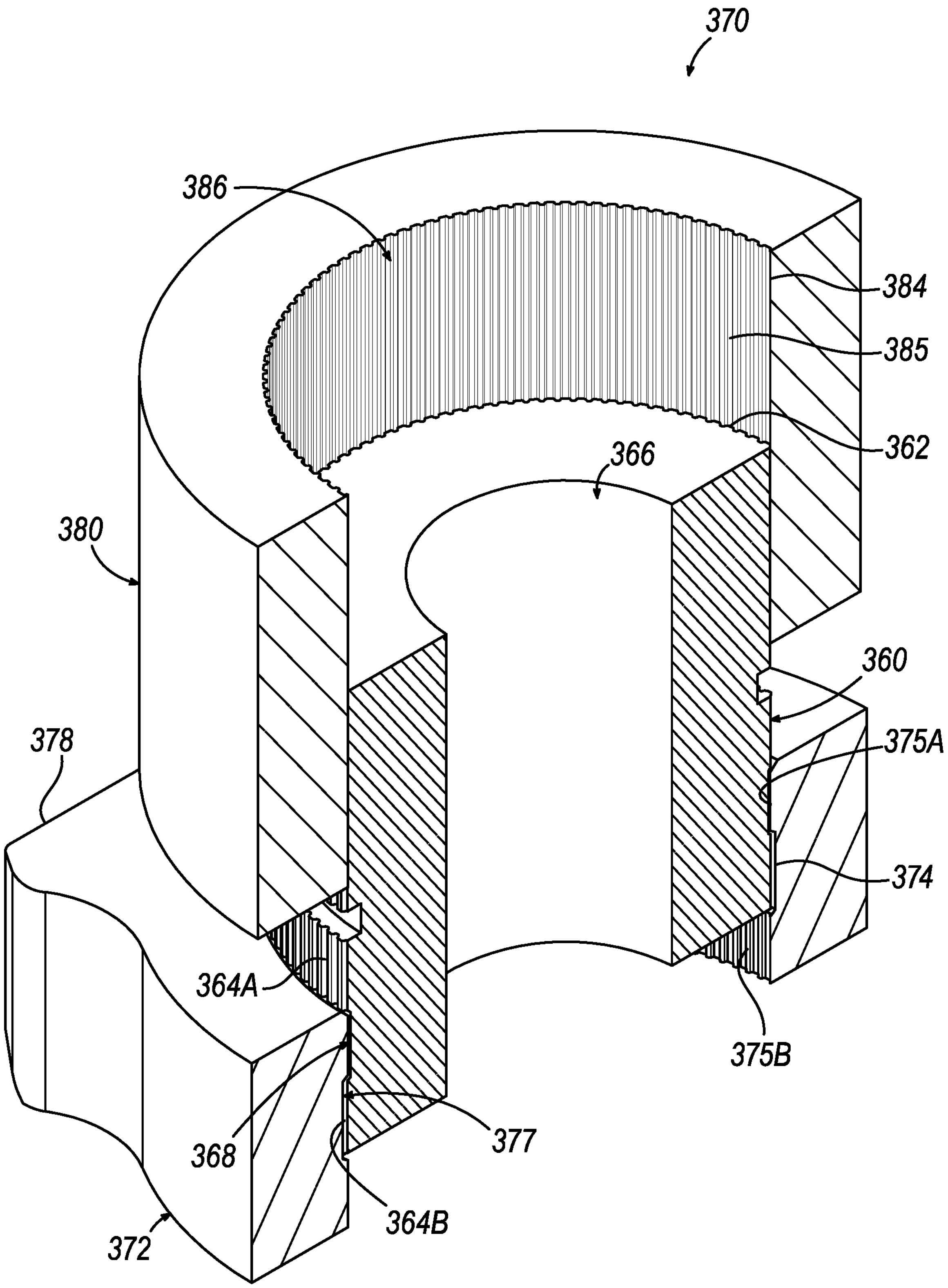
FIG. 13B is a sectional view of a portion of the pivot restraint mechanisms of FIG. 12 in an unrestrained configuration, with portions omitted for purposes of clarity.

When a user desires to pivot arm (322) relative to base frame (330), the user may actuate intermediary body (360) upward in accordance with the description herein to thereby drive arm restraint mechanism (370) into the unrestrained configuration as shown in FIG. 13B. In the unrestrained configuration, intermediary array of complementary splines (364A) is actuated upward out of engagement with splines (375A) of arm restraint body (372). Additionally, lower array of splines (364B) is actuated upward out of engagement with splines (375B) and housed within the confines of annular recess (377). Additionally, annular recess (368) of intermediary body (360) is actuated upward in order to house splines (375A) of arm restraint body (372). Recesses (368, 377) are both dimensions to suitably house their respective splines (375A, 364B) while inhibiting bodies (360, 372) from undesirably engaging each other.

Therefore, splines (364A, 364B) of intermediary body (360) no longer restrain arm (322) from pivoting relative to base frame (330) in the unrestrained configuration, such that a user may rotate arm (322) into a desired position in accordance with the description herein. Additionally, with annular recesses (368, 377) housing a respective array of splines (375A, 364B) in the unrestrained configuration, intermediary body (360) may be required to travel a shorter distance in order to achieve the unrestrained configuration as compared aspects of the disclosure having no annular recesses (368, 377). Therefore, annular recesses (368, 377) may help contribute to the compact nature of arm restraint mechanism (370) while still allowing splines (364A, 364B, 375A, 375B) to not incorporate a generally tapered geometry; which may provide various benefits as would be apparent to one skilled in the art in view of the teachings herein.

Figure 14:
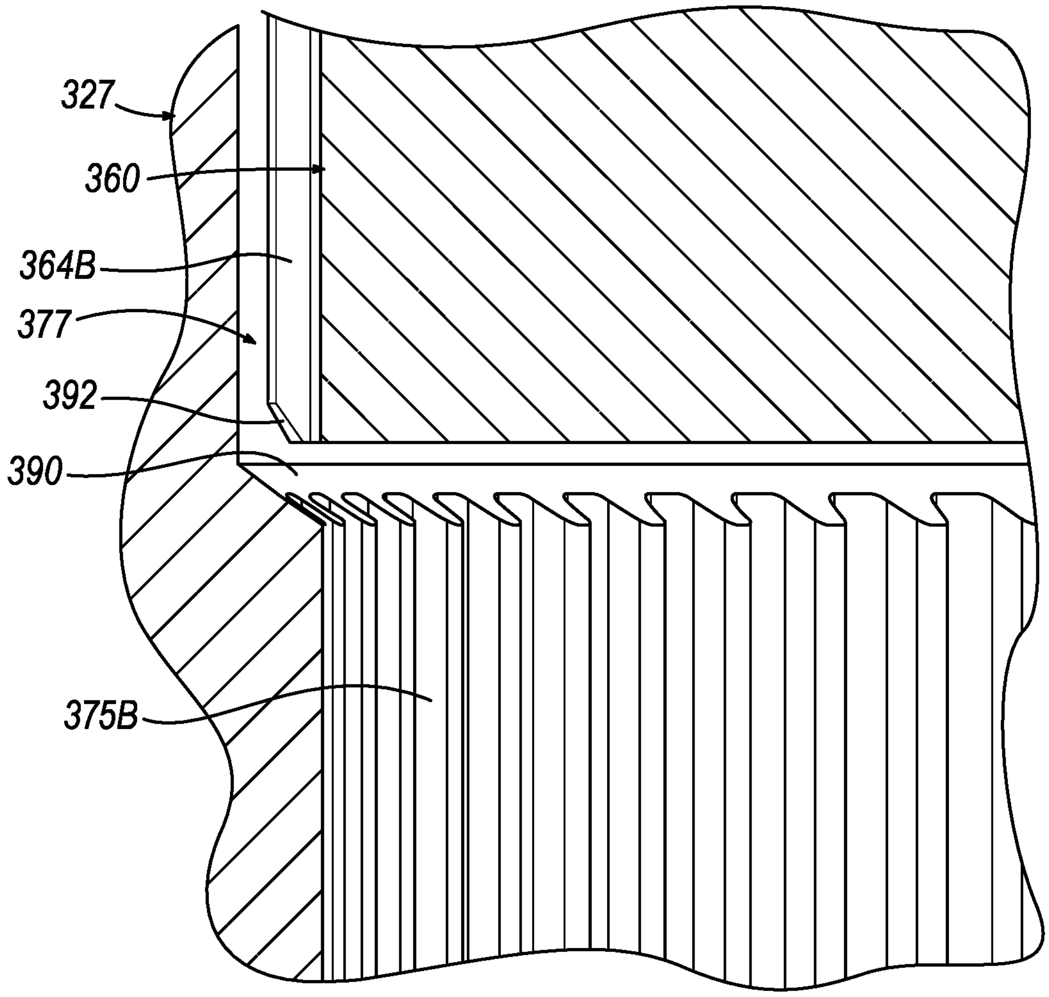
FIG. 14 is an enhanced sectional view of a portion of the pivot restraint mechanisms of FIG. 12 in an unrestrained configuration, with portions omitted for purposes of clarity.

Once a user has rotated arm (322) into a desired rotational position, the user may allow pivot restraining mechanism (370) to return to the restrained configuration. As shown in FIG. 14, splines (364B, 375B) include angled guide surfaces (390, 392) that are configured to engage each other as intermediary body (360) returns to the position associated with the restrained configuration. The angled nature of guide surfaces (390, 392) may help promote sufficient re-engagement of splines (364B, 375B) as pivot restraint mechanism (370) actuated between the unrestrained configuration and the restrained configuration. Therefore, guide surface (390, 392) may help prevent intermediary body (360) from becoming undesirably stuck, or otherwise inhibited, from re-entering the position shown in FIG. 13A. It should be understood that splines (364A, 375A) also may have angled guide surfaces as shown in FIG. 14.

E. Illustrative Arm Restraint Indication Mechanism

As mentioned above, restraint mechanism (70, 270, 370) is configured to actuate between the unrestrained configuration and the restrained configuration in order to selectively rotationally restrain arms (22, 222, 322) relative to base frame (30, 230, 330). In some aspects of the disclosure, it may be desirable for a user to confirm that restraint mechanism (70, 270, 370) is in the unrestrained configuration or the restrained configuration. Therefore, a user may know if restraint mechanism (70, 270, 370) is properly positioned, or if restraint mechanism (70, 270, 370) is stuck, or otherwise position in an undesirable configuration.

Figure 15A:
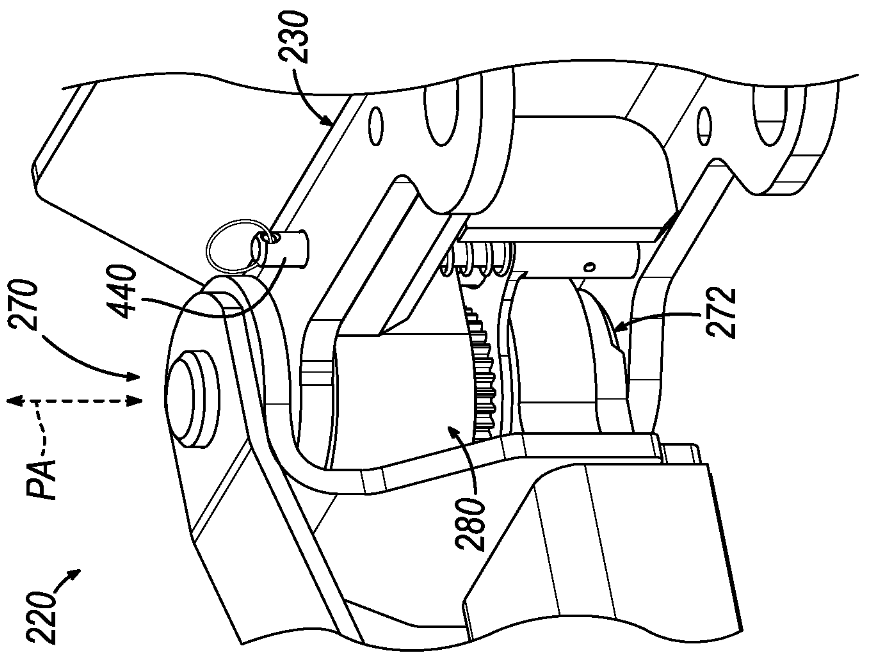
FIG. 15A is a perspective view of the adjustable arm, base frame, and pivot restraint mechanism of FIG. 6 with an alternative pin, where the restraint mechanism is in the restrained configuration.
Figure 15B:
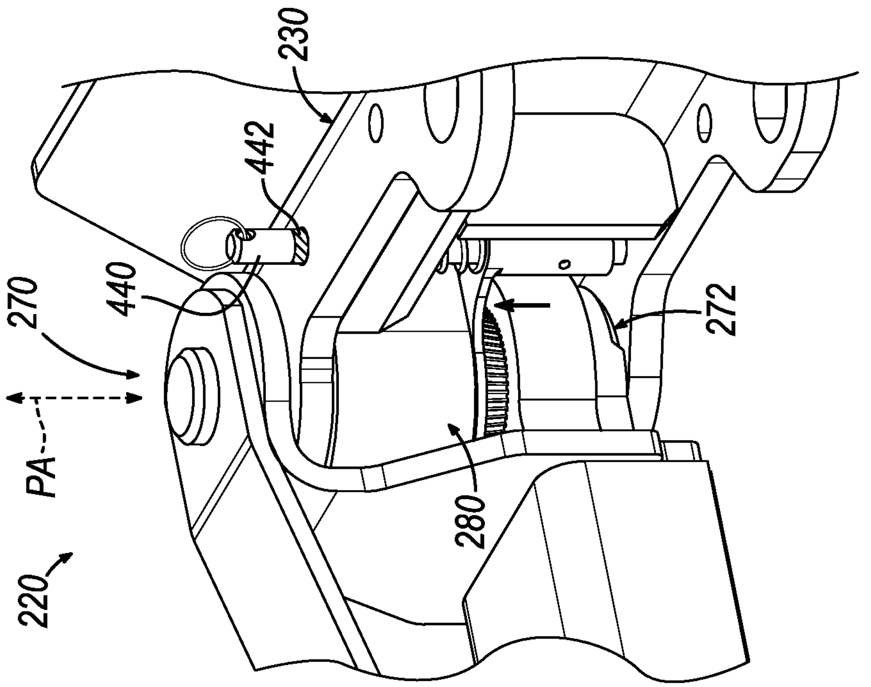
FIG. 15B is a perspective view of the adjustable arm, base frame, and pivot restraint mechanism of FIG. 6 with the alternative pin of FIG. 15A, where the restraint mechanism is in the unrestrained configuration.

FIGS. 15A-15B show an illustrative pin (440) that may be readily incorporated into any restraint mechanism (70, 270, 370) described above. Pin (440) includes a visual indicator (442) that is visible to a user (see FIG. 15B) while restraint mechanism (270) is in the unrestrained configuration, thereby visually confirming to a user that arm (222) is not currently restrained from rotating relative to base frame (230) in accordance with the description herein. As shown in FIG. 15A, visual indicator (442) is dimensioned to be concealed by base frame assembly (230) while restraint mechanism (270) is in the restrained configuration. Therefore, a user may be able to quickly visually confirm what configuration restraint mechanism (270) is currently in without having to physically interact with restraint mechanism (270).

While in the current example, a visual indicator (442) is used, any other suitable means may be used to confirm if restraint mechanism (270) is in the retrained or unrestrained configuration. For example, pin (440) may be configured to engage with an electrical switch coupled with base frame (230). Such an electrical switch may be in communication with a circuit board, which may be configured to generate a suitable signal (audible, illumination, etc.,) that may allow users within the shop floor to confirm what configuration restraint mechanism (270) is currently in.

III. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A vehicle engagement assembly attached to vehicle lift, wherein the vehicle lift is configured to actuate the engagement assembly between a lowered position and a raised position, the vehicle engagement assembly comprises: (a) a base frame comprising a first pair of flanges, each defining a respective base pin hole, (b) a lift arm comprising a second pair of flanges, each defining a respective arm pin hole, wherein the lift arm is pivotally attached to the base frame by a pin about a pivot axis, and (c) a pivot restraint mechanism configured to inhibit rotation of the lift arm relative to the base frame about the pivot axis, the pivot restraint mechanism comprising: (i) an arm restraint body associated with the arm, wherein the pin extends through the arm restraint body, (ii) a base frame restraint body associated with the base frame, wherein the pin extends through the base frame restraint body, and (iii) a rotational stopping surface associated with either the base frame restraint body between the first pair of flanges or the arm restraint body between the second pair of flanges, wherein the rotational stopping surface is configured to abut against a corresponding surface of either the base frame or the arm restraint body in order to rotationally fix either the base frame restraint body or the arm restraint body to the respective base frame or lift arm about the pivot axis.

Example 2

A vehicle engagement assembly attached to a vehicle lift, wherein the vehicle lift is configured to actuate the vehicle engagement assembly between a lowered position and a raised position, the vehicle engagement assembly comprises: (a) a base frame comprising a first pair of flanges and a web connecting the first pair of flanges, wherein at least one flange of the first pair of flanges defines a base pin hole, (b) a lift arm comprising a second pair of flanges, wherein at least one flange of the second pair of flanges defines a lift arm pin hole, wherein the lift arm is pivotally attached to the base frame about a pivot axis via a pin extending through both the base pin hole and the lift arm pin hole, and (c) a pivot restraint mechanism configured to transition between a restrained configuration and an unrestrained configuration, wherein the pivot restraint mechanism in the restrained configuration is configured to inhibit rotation of the lift arm about the pivot axis relative to the base frame, the pivot restraint mechanism comprising: (i) an arm restraint body associated with the lift arm such that the arm restraint body is configured to pivot with the lift arm relative to the base frame about the pivot axis, wherein the arm restraint body is located at least partially between the first pair of flanges and the second pair of flanges, wherein the pin extends through the arm restraint body, (ii) a base frame restraint body associated with the base frame, wherein the base frame restraint body comprises a first rotational stopping surface engaged with the web of the base frame, wherein, while the pivot restraint mechanism is in the restrained configuration, the base frame restraint body is configured to receive a rotational load from the arm restraint body and transfer the rotational load onto the web of the base frame via the first rotational stopping surface.

Example 3

The vehicle engagement assembly of Example 2, wherein the arm restraint body comprises a second rotational stopping surface engaged with an engagement surface of the lift arm, wherein engagement between the engagement surface of the lift arm and the second rotation stopping surface of the arm restraint body is configured to drive rotation of the arm restraint body with the lift arm relative to the base frame about the pivot axis.

Example 4

The vehicle engagement assembly of Example 3, wherein the engagement surface of the lift arm extends between the second pair of flanges.

Example 5

The vehicle engagement assembly of Example 4, wherein the second rotation stopping surface comprises a flat surface.

Example 6

The vehicle engagement assembly of any one or more of Examples 1 through 5, wherein the pair of flanges are pivotally coupled to a second lift arm.

Example 7

The vehicle engagement assembly of Example 6, further comprising a second pivot restraint mechanism configured to inhibit rotation of the second lift arm relative to the base frame, wherein the web is configured to receive a rotational load from imparted from the lift arm onto the second pivot restraint mechanism in order to inhibit rotation of the second lift arm relative to the base frame.

Example 8

The vehicle engagement assembly of any one or more of Examples 1 through 7, wherein the arm restraint body comprises a first plurality of tapered splines.

Example 9

The vehicle engagement assembly of Example 8, wherein the base frame restraint body comprises a second plurality of tapered splines configured to directly engage the first plurality of tapered splines in the restrained configuration.

Example 10

The vehicle engagement assembly of Example 9, wherein the base frame defines a recessed interior dimensioned to house the first plurality of tapered splines.

Example 11

The vehicle engagement assembly of any one or more of Examples 1 through 10, further comprising a translating pin configured to translate relative to the base frame in order to transition the pivot restraint mechanism between the restrained configuration and the unrestrained configuration.

Example 12

The vehicle engagement assembly of any one or more of Examples 1 through 11, wherein the pivot restraint mechanism is biased toward the restrained configuration.

Example 13

The vehicle engagement assembly of any one or more of Examples 1 through 12, further comprising an intermediary restraint body interposed between the arm restraint body and the base frame restraint body.

Example 14

The vehicle engagement assembly of Example 13, wherein the intermediary restraint body is configured to selectively decouple from the arm restraint body while the pivot restraint mechanism is in the unrestrained configuration.

Example 15

The vehicle engagement assembly of either Example 13 or 14, wherein the intermediate restraint body comprises a plurality of vertically extending splines slidably engaged with the base frame restraint body.

Example 16

The vehicle engagement assembly of Example 15, wherein the intermediate restraint body comprises a plurality of tapered splines configured to selectively engage with arm restraint body in the restrained configuration.

Example 17

A vehicle engagement assembly attached to a vehicle lift, wherein the vehicle lift is configured to actuate the vehicle engagement assembly between a lowered position and a raised position, the vehicle engagement assembly comprises: (a) a base frame comprising a first pair of flanges and a web connecting the first pair of flanges, wherein at least one flange of the first pair of flanges defines a base pin hole, (b) a lift arm comprising a second pair of flanges, wherein at least one flange of the second pair of flanges defines a lift arm pin hole, wherein the lift arm is pivotally attached to the base frame about a pivot axis via a pin extending through both the base pin hole and the lift arm pin hole, and (c) a pivot restraint mechanism configured to transition between a restrained configuration and an unrestrained configuration, wherein the pivot restraint mechanism in the unrestrained configuration is configured to permit rotation of the lift arm about the pivot axis relative to the base frame, wherein the pivot restraint mechanism in the restrained configuration is configured to lock rotation of the lift arm about the pivot axis relative to the base frame, the pivot restraint mechanism comprising: (i) an arm restraint body located at least partially between the first pair of flanges and the second pair of flanges, wherein the pin extends through the arm restraint body, (ii) a base frame restraint body associated with the base frame, wherein the base frame restraint body comprises a first rotational stopping surface directly engaged with the web of the base frame such that, when the pivot restraint mechanism is in the restrained configuration, the base frame is configured to transfer a rotational load onto the web of the base frame via the first rotational stopping surface.

Example 18

The vehicle engagement assembly of Example 17, wherein the second pair of flanges are positioned between the first pair of flanges.

Example 19

The vehicle engagement assembly of any one or more of Examples 17 or 18, wherein the arm restraint body is rotationally fixed relative to the lift arm.

Example 20

The vehicle engagement assembly of Example 19, wherein the arm restraint body comprises a rotational stopping surface directly engaged with an engagement surface of the lift arm to thereby rotationally fix the arm restraint body relative to the lift arm.

Example 21

A method of inhibiting rotation of a vehicle lift arm of a vehicle lift using a vehicle engagement assembly, the vehicle lift comprising a base frame and a pin, the base frame comprising a pair of flanges connected to each other via a web, the vehicle engagement assembly comprising a base frame restraint body and an arm restraint body, the method comprising: (a) rotationally fixing the arm restraint body with the vehicle lift arm, (b) rotationally fixing the base frame restraint body with a base frame via direct engagement between the base frame restraint body and the web of the base frame, and (c) selectively coupling the arm restraint body with the base frame restraint body.

We claim:

1. A vehicle engagement assembly attached to a vehicle lift, wherein the vehicle lift is configured to actuate the vehicle engagement assembly between a lowered position and a raised position, the vehicle engagement assembly comprises:

(a) a base frame comprising a first pair of flanges and a web connecting the first pair of flanges, wherein at least one flange of the first pair of flanges defines a base pin hole, (b) a lift arm comprising a second pair of flanges, wherein at least one flange of the second pair of flanges defines a lift arm pin hole, wherein the lift arm is pivotally attached to the base frame about a pivot axis via a pin extending through both the base pin hole and the lift arm pin hole, and (c) a pivot restraint mechanism configured to transition between a restrained configuration and an unrestrained configuration, wherein the pivot restraint mechanism in the restrained configuration is configured to inhibit rotation of the lift arm about the pivot axis relative to the base frame, the pivot restraint mechanism comprising:

(i) an arm restraint body associated with the lift arm such that the arm restraint body is configured to pivot with the lift arm relative to the base frame about the pivot axis, wherein the arm restraint body is located at least partially between the first pair of flanges and the second pair of flanges, wherein the pin extends through the arm restraint body, (ii) a base frame restraint body associated with the base frame, wherein the base frame restraint body comprises a first rotational stopping surface engaged with the web of the base frame, wherein, while the pivot restraint mechanism is in the restrained configuration, the base frame restraint body is configured to receive a rotational load from the arm restraint body and transfer the rotational load onto the web of the base frame via the first rotational stopping surface, and wherein the base frame restraint body is configured to move relative to the base frame in order to transition the pivot restraint mechanism between the restrained configuration and the unrestrained configuration.

2. The vehicle engagement assembly of claim 1, wherein the arm restraint body comprises a second rotational stopping surface engaged with an engagement surface of the lift arm, wherein engagement between the engagement surface of the lift arm and the second rotational stopping surface of the arm restraint body is configured to drive rotation of the arm restraint body with the lift arm relative to the base frame about the pivot axis.

3. The vehicle engagement assembly of claim 2, wherein the engagement surface of the lift arm extends between the second pair of flanges.

4. The vehicle engagement assembly of claim 3, wherein the second rotation stopping surface comprises a flat surface.

5. The vehicle engagement assembly of claim 1, wherein the pair of flanges are pivotally coupled to a second lift arm.

6. The vehicle engagement assembly of claim 5, further comprising a second pivot restraint mechanism configured to inhibit rotation of the second lift arm relative to the base frame, wherein the web is configured to receive a rotational load from imparted from the lift arm onto the second pivot restraint mechanism in order to inhibit rotation of the second lift arm relative to the base frame.

7. The vehicle engagement assembly of claim 1, wherein the arm restraint body comprises a first plurality of tapered splines.

8. The vehicle engagement assembly of claim 7, wherein the base frame restraint body comprises a second plurality of tapered splines configured to directly engage the first plurality of tapered splines in the restrained configuration.

9. The vehicle engagement assembly of claim 8, wherein the base frame defines a recessed interior dimensioned to house the first plurality of tapered splines.

10. The vehicle engagement assembly of claim 1, further comprising a translating pin configured to translate relative to the base frame in order to transition the pivot restraint mechanism between the restrained configuration and the unrestrained configuration.

11. The vehicle engagement assembly of claim 1, wherein the pivot restraint mechanism is biased toward the restrained configuration.

12. A vehicle engagement assembly attached to a vehicle lift, wherein the vehicle lift is configured to actuate the vehicle engagement assembly between a lowered position and a raised position, the vehicle engagement assembly comprises:

(a) a base frame comprising a first pair of flanges and a web connecting the first pair of flanges, wherein at least one flange of the first pair of flanges defines a base pin hole, (b) a lift arm comprising a second pair of flanges, wherein at least one flange of the second pair of flanges defines a lift arm pin hole, wherein the lift arm is pivotally attached to the base frame about a pivot axis via a pin extending through both the base pin hole and the lift arm pin hole, and (c) a pivot restraint mechanism configured to transition between a restrained configuration and an unrestrained configured, wherein the pivot restraint mechanism in the unrestrained configuration is configured to permit rotation of the lift arm about the pivot axis relative to the base frame, wherein the pivot restraint mechanism in the restrained configuration is configured to lock rotation of the lift arm about the pivot axis relative to the base frame, the pivot restraint mechanism comprising:

(i) an arm restraint body located at least partially between the first pair of flanges and the second pair of flanges, wherein the pin extends through the arm restraint body, (ii) a base frame restraint body associated with the base frame, wherein the base frame restraint body comprises a first rotational stopping surface directly engaged with the web of the base frame such that, when the pivot restraint mechanism is in the restrained configuration, the base frame restraint body is configured to transfer a rotational load onto the web of the base frame via the first rotational stopping surface, wherein the arm restraint body comprises a second rotational stopping surface engaged with an engagement surface of the lift arm, wherein engagement between the engagement surface of the lift arm and the second rotational stopping surface of the arm restraint body is configured to drive rotation of the arm restraint body with the lift arm relative to the base frame about the pivot axis, wherein the engagement surface of the lift arm extends between the second pair of flanges.

13. The vehicle engagement assembly of claim 12, wherein the second pair of flanges are positioned between the first pair of flanges.

14. The vehicle engagement assembly of claim 12, wherein the arm restraint body is rotationally fixed relative to the lift arm.

15. The vehicle engagement assembly of claim 12 wherein the second rotation stopping surface comprises a flat surface.

16. A method of inhibiting rotation of a vehicle lift arm of a vehicle lift using a vehicle engagement assembly, the vehicle lift comprising a base frame and a pin, the base frame comprising a pair of flanges connected to each other via a web, the vehicle engagement assembly comprising a base frame restraint body and an arm restraint body, the method comprising:

(a) rotationally fixing the arm restraint body with the vehicle lift arm, (b) rotationally fixing the base frame restraint body with a base frame via direct engagement between the base frame restraint body and the web of the base frame, and (c) selectively coupling the arm restraint body with the base frame restraint body by actuating the base frame restraint body relative to the web of the base frame.

17. A vehicle engagement assembly attached to a vehicle lift, wherein the vehicle lift is configured to actuate the vehicle engagement assembly between a lowered position and a raised position, the vehicle engagement assembly comprises:

(a) a base frame comprising a first pair of flanges and a web connecting the first pair of flanges, wherein at least one flange of the first pair of flanges defines a base pin hole, (b) a lift arm comprising a second pair of flanges, wherein at least one flange of the second pair of flanges defines a lift arm pin hole, wherein the lift arm is pivotally attached to the base frame about a pivot axis via a pin extending through both the base pin hole and the lift arm pin hole, and (c) a pivot restraint mechanism configured to transition between a restrained configuration and an unrestrained configuration, wherein the pivot restraint mechanism in the restrained configuration is configured to inhibit rotation of the lift arm about the pivot axis relative to the base frame, the pivot restraint mechanism comprising:

(i) an arm restraint body associated with the lift arm such that the arm restraint body is configured to pivot with the lift arm relative to the base frame about the pivot axis, wherein the arm restraint body is located at least partially between the first pair of flanges and the second pair of flanges, wherein the pin extends through the arm restraint body, (ii) a base frame restraint body associated with the base frame, wherein the base frame restraint body comprises a first rotational stopping surface engaged with the web of the base frame, wherein, while the pivot restraint mechanism is in the restrained configuration, the base frame restraint body is configured to receive a rotational load from the arm restraint body and transfer the rotational load onto the web of the base frame via the first rotational stopping surface, and (iii) an intermediary restraint body interposed between the arm restraint body and the base frame restraint body.

18. The vehicle engagement assembly of claim 17, wherein the intermediary restraint body is configured to selectively decouple from the arm restraint body while the pivot restraint mechanism is in the unrestrained configuration.

19. The vehicle engagement assembly of claim 17, wherein the intermediate restraint body comprises a plurality of vertically extending splines slidably engaged with the base frame restraint body.

20. The vehicle engagement assembly of claim 19, wherein the intermediate restraint body comprises a plurality of tapered splines configured to selectively engage with the arm restraint body in the restrained configuration.

* * * * *